United States Patent
Cesario et al.

(10) Patent No.: US 7,659,685 B2
(45) Date of Patent: Feb. 9, 2010

(54) METHOD OF ESTIMATING THE STATE OF A SYSTEM AND RELATIVE DEVICE FOR ESTIMATING POSITION AND SPEED OF THE ROTOR OF A BRUSHLESS MOTOR

(75) Inventors: Nicola Cesario, Casalnuovo di Napoli (IT); Stefano Baratto, Naples (IT); Maurizio Di Meglio, Casoria (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 359 days.

(21) Appl. No.: 11/833,053

(22) Filed: Aug. 2, 2007

(65) Prior Publication Data
US 2009/0033259 A1 Feb. 5, 2009

(30) Foreign Application Priority Data
Aug. 3, 2006 (EP) ................... 06425561

(51) Int. Cl.
*H02P 6/00* (2006.01)
(52) U.S. Cl. ............ 318/712; 318/716; 318/568.13
(58) Field of Classification Search ......... 318/727, 318/804, 805, 806, 568.11, 568.13, 568.18
See application file for complete search history.

(56) References Cited

U.S. PATENT DOCUMENTS

| | | | | |
|---|---|---|---|---|
| 6,316,904 | B1 * | 11/2001 | Semenov et al. | 318/727 |
| 7,294,988 | B2 * | 11/2007 | Ajima et al. | 318/712 |
| 2003/0060902 | A1 | 3/2003 | Miller | 700/32 |
| 2004/0062062 | A1 * | 4/2004 | Lee et al. | 363/37 |
| 2005/0007044 | A1 | 1/2005 | Qiu et al. | 318/254 |
| 2006/0125439 | A1 * | 6/2006 | Ajima et al. | 318/716 |

OTHER PUBLICATIONS

Alanis et al.; "*Discrete-Time Recurrent Neural Induction Motor Control Using Kalman Learning*"; Jul. 2006; pp. 1993-2000; XP002410493.

* cited by examiner

*Primary Examiner*—Paul Ip
(74) *Attorney, Agent, or Firm*—Lisa K. Jorgenson; Allen, Dyer, Doppelt, Milbrath & Gilchrist, P.A.

(57) ABSTRACT

A method for estimating the state of a system, as well as an extended Kalman filter (EKF), allows nonlinear mathematical models to be used for describing the system. Accurate precision is provided since the method is based on an EKF technique while using a filter that implements a first degree Stirling approximation formula. The method may be used for estimating position and speed of a brushless motor, and may be implemented in a relative device. Such a device may be introduced in a control loop of a brushless motor of a power steering system for a vehicle to provide a countering torque on the steering wheel based on speed of the vehicle and a steering angle of the vehicle.

29 Claims, 9 Drawing Sheets

METHOD OF ESTIMATING THE STATE OF A SYSTEM AND RELATIVE DEVICE FOR ESTIMATING POSITION AND SPEED OF THE ROTOR OF A BRUSHLESS MOTOR

FIELD OF THE INVENTION

The present invention relates to techniques for estimating the evolution of a system, and more particularly, to a method for estimating the state of a system. The method may be used for estimating position and speed of a brushless motor without using speed and position sensors, and may be implemented in hardware. The present invention further relates to a device for generating estimation signals of position and speed of a rotor of the brushless motor, for a feedback control device of the brushless motor and to a power steering system that implements the above method.

BACKGROUND OF THE INVENTION

Electrical motors are used in the automotive field not only in electrically powered cars but also as actuators in servo-systems for driving pumps, compressors and the like. Many functional devices of a car are motorized, such as the fuel pump, the over-modulation compressor, the transmission gears, the power steering, and so forth.

Traditionally, these functional devices were servo-assisted by exploiting the motor torque available on the shaft of the thermal engine of the car. This implied inefficiencies in using part of the mechanical energy obtained by burning fuel for powering these devices. Lately, the use of electrical motors that convert electric energy into mechanical energy has become more and more the preferred choice.

Permanent magnet brushless motors are often preferred in these automotive applications. The characteristics of permanent magnet brushless motors are particularly suitable for automotive applications. They are relatively lightweight, have a high power density, a small size and are very reliable. However, they are relatively expensive due to the costs of the magnets used for fabricating the rotor, more difficult to control than a traditional DC electrical machine, and require precise angular position sensors depending on the brushless motor and the control strategy.

In particular, when implementing control strategies that contemplate a sinusoidal modulation of the PWM (Pulse Width Modulation), whether DC (trapezoidal induced back electromotive force) or AC (sinusoidal induced back electromotive force), it is necessary to use sensors for the angular position, such as (incremental or absolute) encoders and resolvers that are relatively expensive (encoders) or require complicated sensing techniques (resolvers).

For these reasons, the use of sensorless control algorithms that, based upon the detection of quantities the value of which is measurable and/or available in a simple and economic way, provide an approximated estimation of the angular position of the rotor. Many applications do not allow use of sensorless techniques because, particularly model-based techniques do not allow an accurate estimation of the angular position at low speeds and do not provide any estimation at practically null speed. Model-based techniques are based on a mathematic model of the physical system.

In certain applications this problem is eliminated by implementing alignment procedures and by using start-up ramps intended to initialize the sensorless algorithm. It is evident that certain applications, such as electrically assisted power steering systems, do not allow pauses between the instant of application of the reference signal and its effective actuation.

For these applications that are safety-critical applications, sensorless algorithms may be a reliable alternative.

Often in traditional control systems, a second angular position sensor is commonly installed for controlling that the first sensor is working correctly. Indeed, a sensorless estimation algorithm could compensate errors due to aging or to alterations of the main sensor, making superfluous the second sensor and thus solving the drawback of its encumbrance.

Many examples of use of estimators of the angular position of the rotor of a permanent magnet brushless machine may be found in the literature [4]. In particular, as far as the model-based approaches are concerned, one of the most used techniques is based on the "state observers" for monitoring the state of the system. In this case it is necessary to know at least roughly a mathematical model of the electrical machine.

FIG. 1 illustrates the block diagram of a typical field oriented control of a permanent magnet brushless machine (BLDC). The feedback signals, $I_{sd}$ (direct current) and $I_{sq}$ (quadrature current), that the PI controllers compare with the reference currents $I_{sd}^{ref}$ and $I_{sq}^{ref}$, are obtained with a double transform of the phase currents of the motor $I_U$, $I_V$ and $I_W$. These currents, measured by sensors, are first transformed from the three-phase statoric reference system to a two-phase statoric reference system (Clarke transform), $$I_\alpha = I_U$$
$$I_\beta = \frac{I_U}{\sqrt{3}} + \frac{2I_V}{\sqrt{3}} \quad (1)$$
$$0 = I_U + I_V + I_W$$

To transform the currents $I_\alpha$, $I_\beta$ in a rotoric reference system (that is, a time invariant system of coordinates), a further transform is necessary (Park transform) in which the angular position θ of the rotor is used:

$$I_{sd} = I_\alpha \cos(\theta) + I_\beta \sin(\theta)$$
$$I_{sq} = -I_\alpha \sin(\theta) + I_\beta \cos(\theta) \quad (2)$$

The PI controllers (that is, the controllers with a proportional-integral action), generate reference voltages $U_{sd}^{ref}$ and $U_{sq}^{ref}$ as a function of the difference between the reference currents and the feedback currents. These voltages, after having been transformed with the inverse of the Park transform, $$U_\alpha^{ref} = U_{sd}^{ref} \cos(\theta) - U_{sq}^{ref} \sin(\theta)$$
$$U_\beta^{ref} = U_{sd}^{ref} \sin(\theta) + U_{sq}^{ref} \cos(\theta) \quad (3)$$

are supplied to the PWM generator.

The dynamics of the brushless motor may be studied both in the system of coordinates (d,q) as well as in the system (α,β). In the system (d,q), the dynamics of the system is expressed by the following equations:

$$L_{sq}\dot{I}_{sq} = -L_{sd}z_p\dot{\theta}I_{sd} - c_M\dot{\theta} - R_sI_{sq} + U_{sq}$$
$$L_{sd}\dot{I}_{sd} = L_{sq}z_p\dot{\theta}I_{sq} - R_sI_{sd} + U_{sd}$$
$$J_M\ddot{\theta} = -b_M\dot{\theta} + c_MI_{sq} - M_{load} \quad (4)$$

wherein $z_p$ indicates the number of polar pairs, $c_M$ the constant of the electrical machine (that is, the ratio between the generated torque and the current $I_{sq}$ circulating when the rotor is blocked), $R_s$ and $L_s$ the resistance and the inductance of the windings, $U_{sd}$ and $U_{sq}$ the reference voltages. As far as the equation of mechanical equilibrium is concerned, $J_M$, $b_M$ and $M_{load}$ indicate the momentum of inertia, a dampening coefficient and the load moved by the electrical machine, respectively.

In most of the followed approaches, the dynamics of the brushless motor is approximated with that of a DC motor, and it is assumed that id is null. Equations (4) may be simplified as follows:

$$L_{sq}\dot{I}_{sq} = -c_M\dot{\theta} - R_s I_{sq} + U_{sq}$$

$$J_M\ddot{\theta} = -b_M\dot{\theta} + c_M I_{sq} - M_{load} \quad (5)$$

The values of state variables of the brushless motor, that in equation (5) are the current $I_{sq}$ and the speed $\dot{\theta}$, may be estimated with the "state estimators." State estimators are algorithms for calculating the values of state variables of a system, if a mathematical model thereof defined as a function of the detected inputs and outputs variables is known.

A state observer that is largely used for controlling brushless motors is the Luenberg state observer [4]. This state observer, even if it is relatively simple, applies only for systems the dynamics of which is described by linear equations. It may be applied for tracking the kinematics of the rotor of a brushless electric machine if the approximation of equations (5) is reasonable.

In case it is not possible to estimate the angular position by using the linear equations (5), the parameters of the observer need to be estimated by introducing a Lyapunov function to be minimized. This technique is rather complicated because it presumes that an exact model of the motor is known, and an appropriate choice of the Lyapunov function is to be minimized. Moreover, it is necessary to estimate at least two of the three phase currents of the motor and the supply voltages.

A state observer that considers also the noise that disturbs the measurement of the values of state variables is the extended Kalman filter. To better understand the field of application of this invention, the functioning of an extended Kalman filter is briefly explained.

From a statistical point of view, the optimal state observer is the Kalman filter. The gain of the filter is calculated considering also the statistical properties of the noise of the process (uncertainty relative to the knowledge of the dynamics of the system) and of the measurement error.

The extended Kalman filter (EKF) is an improvement of the Kalman filter suitable for systems having nonlinear dynamics, and may be used for estimating speed and position of the rotor. Therefore, it is possible to use equations (4) as a mathematical model of the brushless motor.

The advantage with respect to other model-based approaches (such as the Luenberger state observer) includes not needing to use a linear approximation of the nonlinear mathematical model that describes the dynamics of the motor.

The extended Kalman filter applies to discrete-time state equations, such as:

$$\overline{x(k+1)} = \overline{f(\overline{x(k)},\overline{u(k)})} + \overline{v(k)} \quad \overline{x(0)} = \overline{x_0}$$

$$\overline{y(k)} = \overline{g(\overline{x(k)})} + \overline{w(k)} \quad (6)$$

where
$\overline{x(k)}$ is the state of the system,
$\overline{u(k)}$ is the input of the system,
$\overline{y(k)}$ is the output of the system,
$\overline{v(k)}$ is the process noise, and
$\overline{w(k)}$ is the measurement noise.

These variables are detected at the step k and in which the functions $\overline{f(.)}$ and $\overline{g(.)}$ are two generic nonlinear vector functions with vector variables. The process noise $\overline{v(k)}$ and the measurement noise $\overline{w(k)}$ are uncorrelated between them, have a null average and are characterized by the respective covariance matrices $\overline{Q}$ and $\overline{R}$:

$$\overline{Q} = E\{\overline{v(k)} \cdot \overline{v(k)}^T\}; \overline{R} = E\{\overline{w(k)} \cdot \overline{w(k)}^T\}.$$

To apply the EKF to a system of continuous-time nonlinear system of equations, the system of nonlinear equations is linearized and discretized around sampling instants taken at constant intervals, thus the standard Kalman filter is applied to the linearized system of discrete-time equations.

The a priori estimation of the state variables $\overline{x(k+1|k)}$ of the system at the step k+1 is a function of the a priori estimation $\overline{x(k|k)}$ and of the measure of the input variables $\overline{u(k)}$ at step k, that is:

$$\overline{x(k+1|k)} = \overline{f(\overline{x(k|k)},\overline{u(k)})} \quad (7)$$

To calculate the a posteriori estimation $\overline{x(k|k)}$, the measurement of the output $\overline{y(k)}$ of the system at the current step is used, that is $$\overline{x(k|k)} = \overline{x(k|k-1)} + \overline{K(k)} \cdot (\overline{y(k)} - \overline{g(\overline{x(k|k-1)},\overline{u(k)})}) \quad (8)$$

where $\overline{K(k)}$ is the gain of the Kalman filter at the step k that is tied to the values of the covariance matrices of the process and measurement noise.

To make the Kalman filter provide accurate estimations of the outputs of the system, the values of the matrix of gains $\overline{K(k)}$ are adjusted such that the estimated values of the outputs $\overline{g(\overline{x(k|k-1)},\overline{u(k)})}$ by the Kalman filter are as close as possible to the effectively measured outputs $\overline{y(k)}$.

By linearizing and discretizing a system of input-state-output equations, the result is that the variation of the state of the system from step k to step k+1, that is $$\overline{\Delta x(k)} = \frac{x(k+1) - x(k)}{T_s}$$

may be described as follows:

$$\overline{\Delta x(k+1)} = \overline{F_1(k)} \cdot \overline{\Delta x(k)} + \overline{F_2(k)} \cdot \overline{\Delta u(k)} + \overline{v(k)} \quad \overline{x(0)} = \overline{x_0}$$

$$\overline{\Delta y(k)} = \overline{C(k)} \cdot \overline{\Delta x(k)} + \overline{w(k)} \quad (9)$$

and the gain $\overline{K(k)}$ of the EKF filter is:

$$\overline{K(k)} = \overline{P(k|k-1)} \cdot \overline{C(k)}^T \cdot (\overline{C(k)} \cdot \overline{P(k|k-1)} \cdot \overline{C(k)}^T + \overline{R})^{-1}$$

with $$\overline{P(k+1|k)} = \overline{F_1(k)} \cdot \overline{P(k|k)} \cdot \overline{F_1(k)}^T + \overline{Q}$$

$$\overline{P(k|k)} = (\overline{I} - \overline{K}(k) \cdot \overline{C(k)}) \cdot \overline{P(k|k-1)}$$

where $\overline{P(k+1|k)}$ and $\overline{P(k|k)}$ are covariance matrices associated with the estimations of the state a priori and a posteriori, respectively. The latter expresses the uncertainties that affect the a priori and a posteriori estimations of the state, respectively. For the system of equations that describe a brushless motor, state input and output variables are chosen for the following quantities:

$$\overline{x} = [I_{sq}, I_{sd}, \omega, \theta]^T; \overline{u} = [U_{sq}, U_{se}]^T; \overline{y} = [I_{sq}, I_{sd}, \omega, \theta]^T;$$

where $\omega=\dot{\theta}$, it is:

$$\overline{f(\overline{x},\overline{u})} = T_S \begin{pmatrix} -\frac{R_s \cdot I_{sd}}{L_s} + z_p \cdot \omega \cdot I_{sq} \\ -\frac{R_s \cdot I_{sq}}{L_s} - z_p \cdot \omega \cdot I_{sd} - \frac{c_M \omega}{L_s} \\ -\frac{b_M}{J_M}\omega + \frac{c_M}{J_M}I_{sq} \\ \omega \end{pmatrix} + \begin{pmatrix} \frac{U_{sd}}{L_s} \\ \frac{U_{sq}}{L_s} \\ -\frac{M_{load}}{J_M} \\ 0 \end{pmatrix}; \quad (10)$$

$$\overline{g(\overline{x},\overline{u})} = \begin{pmatrix} I_{sd} \\ I_{sq} \\ \omega \\ \theta \end{pmatrix}$$

and for the sake of simplicity, $L_{sd}=L_{sq}=L_s$. As a consequence:

$$\overline{F_1(k)} = [\nabla_x \overline{f(\overline{x},\overline{u})}]_{x=\overline{x}(k),u=\overline{u}(k)}$$

$$= T_s \begin{pmatrix} -\frac{R_s}{L_s} & z_p \cdot \omega(k) & z_p \cdot I_{sq}(k) & 0 \\ -z_p \cdot \omega(k) & -\frac{R_s}{L_s} & -\frac{c_M}{L_s} - z_p \cdot I_{sd} & 0 \\ 0 & \frac{c_M}{J_M} & -\frac{b_M}{J_M} & 0 \\ 0 & 0 & 1 & 0 \end{pmatrix}$$

$$\overline{C(k)} = [\nabla_x \overline{g(\overline{x},\overline{u})}]_{x=\overline{x}(k),u=\overline{u}(k)} = \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

The EKF may be used when the covariance matrices of the process noise $\overline{Q}$ and of the measurement noise $\overline{R}$ are known. If these matrices are known, it is possible to calculate at each step the gain of the EKF and thus to estimate the state of the system. In [4] different model-based approaches are compared for estimating the angular position of the rotor of a permanent magnet brushless machine, a Luenberger state observer, a reduced Luenberger state observer, an EKE and so on. The best performances in terms of accuracy in tracking the kinematics of the rotor are provided by the EKF. In the cited article the computational loads (that is scalar multiplications, integrations, trigonometric functions) of the various approaches are compared among them, and the result is that the EKF is very burdensome from a computational point of view.

As for other model-based approaches, there is no deterministic and objective method for determining the covariance matrices of the measurement and process noise, and they need to be fixed for using the extended Kalman filter. An imprecise estimation of the matrices $\overline{Q}$ and $\overline{R}$ may cause an imprecise control of the system to be controlled.

Moreover, an inappropriate choice of the values of the components of the covariance matrix $\overline{P(0|0)}$ associated to the estimation a posteriori of the initial state may worsen the precision of the control.

SUMMARY OF THE INVENTION

In view of the foregoing background, an object of the present invention is to overcome the above drawbacks for estimating data on the state of a system.

This and other objects, advantages and features in accordance with the present invention are provided by a method that includes the use of EKF filters for using nonlinear mathematical models that describe the systems, but ensures a more accurate precision. This result is due to the fact that the method is based on the ESF technique, but it differs from it for adapting it to work with a filter that implements a first degree Stirling approximation formula.

Moreover, the matrices $\overline{Q}$, $\overline{R}$ and $\overline{P(0|0)}$ may be estimated during an off-line training phase by an evolutionary algorithm for minimizing or reducing a pre-established cost function defined as a function of the estimated outputs of the system, of the detected outputs, of the estimated values of at least a state of the system and of the corresponding detected values in response to a pre-established input pattern. This allows accurate estimations to be obtained for data of a state of a system without knowing all initial conditions.

The cost function may be the mean square error of the difference between the estimated and the measured outputs, and between the estimated values of at least a state variable of the system and the corresponding detected values in response to a pre-established input pattern.

Once the off-line training phase is finished, the matrices $\overline{Q}$, $\overline{R}$ and $\overline{P(0|0)}$ are known and it is possible to estimate data of a state starting from the inputs and the outputs of the system. By applying the just described technique to a brushless motor, it is possible to estimate position and speed of the rotor of the motor without installing dedicated sensors thereon. This may be done simply by detecting the currents that flows through the windings (that are the outputs of the brushless motor) and the driving voltages of the motor (that are the inputs of the motor).

The method for estimating position and speed of a brushless motor may be implemented in a corresponding device. Such a device may be used for controlling a brushless motor, or it may be introduced in the control loop of a brushless motor of a power steering system to make the driver feel an opposing torque on the steering wheel that is determined, according to a pre-established waveform, as a function of the speed of the vehicle and of the steering angle.

Alternatively, the above method may even be implemented via software by a program executed by a computer or a microprocessor.

DETAILED DESCRIPTION OF THE PREFERRED EMBODIMENTS

Figure 1:
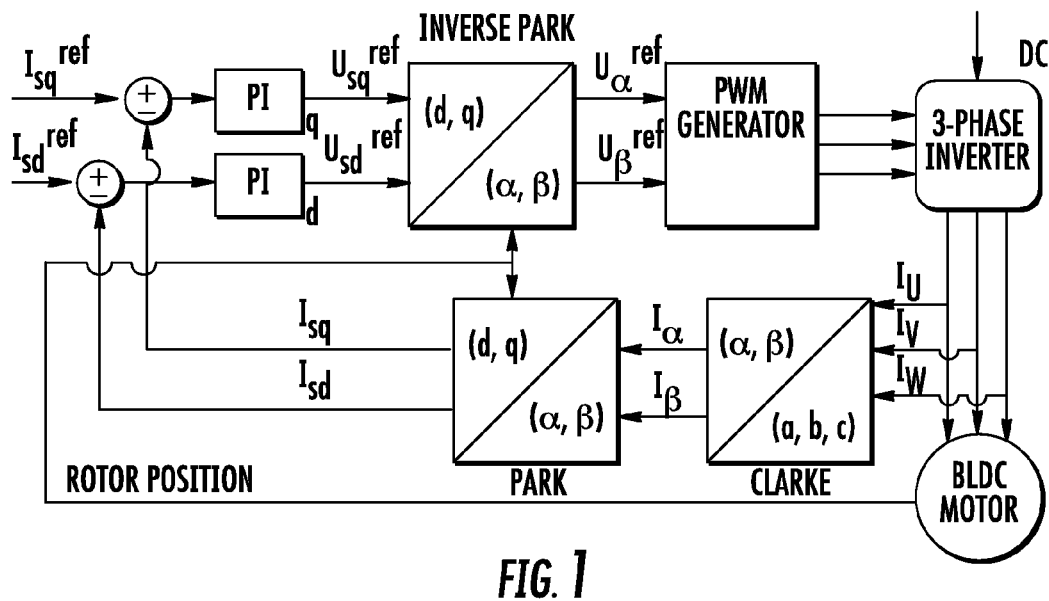
FIG. 1 depicts a block diagram of a typical field oriented control of a permanent magnet brushless machine according to the prior art.

A method based on a free-derivative state observer for estimating data of state variables of a system that may be used, in particular, for estimating, in a sensorless fashion, speed and position of the rotor of a brushless motor without installing dedicated sensors will now be described.

Compared with other model-based approaches used for tracking the kinematics of the rotor (such as the Extended Kalman Filter), the method is advantageous both from the point of view of the computational load required for its implementation, and from the point of view of the rapidness of its response and the accuracy of its estimations.

As far as the tuning of parameters of the "free derivative" filter is concerned, the method uses a soft computing procedure based on the use of evolutionary algorithms. The method has been tested on an EPS application (Electric Power Steering). That is, on specific application patterns of an EPS system wherein the brushless motor is used for providing a torque for helping the driver while steering.

To better understand the method, a brief introduction to "free derivative" observers is provided below. Numerous articles available in literature show how in different applications concerning systems with nonlinear dynamics the use of free-derivative state observers for estimating the state variables of the systems provides more accurate results than traditional approaches, such as EKF [3].

Before showing how a free-derivative state observer can be used for carrying out an accurate tracking of the kinematics of the rotor of a permanent magnet brushless machine, a brief introduction to the techniques used for developing this state observer is provided. In particular, a different way of approximating locally an arbitrary function without using the classic Taylor expansion of the function will be shown.

The Stirling approximation formula will now be discussed. Given an analytic function f, it may be represented in a neighborhood of a point $\bar{x}$ with the well known Taylor series expansion, $$f(x) = f(\bar{x}) + f'(\bar{x})(x-\bar{x}) + \frac{f^{(2)}(\bar{x})}{2}(x-\bar{x})^2 + \frac{f^{(3)}(\bar{x})}{6}(x-\bar{x})^3 + \ldots \quad (11)$$

In general, with the Taylor series expansion, the more elements of the series are considered, the more accurate is the approximation of the function. There are various formulas for interpolating functions that do not require the calculation of derivatives but simply need evaluating the function in a finite number of points. Implementation of these interpolating formulas is simpler than traditional interpolating formulas.

One of the most known interpolating formulas is the Stirling formula. Given two operators $\delta$ and $\mu$ such that $$\delta f(x) = f\left(x+\frac{h}{2}\right) - f\left(x-\frac{h}{2}\right) \quad (12)$$

$$\mu f(x) = \frac{1}{2}\left(f\left(x+\frac{h}{2}\right) + f\left(x-\frac{h}{2}\right)\right)$$

the approximation of the function f in the neighborhood of a point x may be expressed as follows, $$f(x) = f(\bar{x}+ph) = f(\bar{x}) + p\mu\delta f(\bar{x}) + \frac{p^2}{2}\delta^2 f(\bar{x}) + \binom{p+1}{3}\mu\delta^3 f(\bar{x}) + \frac{p^2(p^2-1)}{2\cdot 3\cdot 4}\delta^4 f(\bar{x}) + \binom{p+2}{5}\mu\delta^5 f(\bar{x}) + \ldots \quad (13)$$

wherein $-1<p<1$. By limiting the polynomial approximation to the second order, $$f(x) \approx f(\bar{x}) + f'_{DD}(\bar{x})(x-\bar{x}) + \frac{f''_{DD}(\bar{x})}{2}(x-\bar{x})^2 \quad (14)$$

wherein $$f'_{DD}(\bar{x}) = \frac{f(\bar{x}+h) - f(\bar{x}-h)}{2h} \quad f''_{DD}(\bar{x}) = \frac{f(\bar{x}+h) + f(\bar{x}-h) - 2f(\bar{x})}{h^2} \quad (15)$$

Equation (14) may be interpreted as a Taylor approximation in which the derivatives are substituted by central finite differences, such as equations (15). To evaluate the accuracy of the approximation it is sufficient to substitute in equation (14) the Taylor series expansion (equation (11)) in place of $f(\bar{x}+h)$ and $f(\bar{x}-h)$. Therefore, $$f(\bar{x}) + f'_{DD}(\bar{x})(x-\bar{x}) + \frac{f''_{DD}(\bar{x})}{2}(x-\bar{x})^2 = f(\bar{x}) + f'(\bar{x})(x-\bar{x}) + \frac{f''(\bar{x})}{2}(x-\bar{x})^2 + \left( \frac{f^{(3)}(\bar{x})h^2}{2 \cdot 3} + \frac{f^{(5)}(\bar{x})h^4}{2 \cdot 3 \cdot 4 \cdot 5} + \ldots \right)(x-\bar{x}) + \left( \frac{f^{(4)}(\bar{x})h^2}{2 \cdot 3 \cdot 4} + \frac{f^{(6)}(\bar{x})h^4}{2 \cdot 3 \cdot 4 \cdot 5 \cdot 6} + \ldots \right)(x-\bar{x})^2 \quad (16)$$

From equation (16) it is possible to infer that the polynomial approximation to the second order based on the Stirling formula coincides with the Taylor approximation of the function to the second order but for a remainder (that is, of the two last terms at the right side of equation (16)) the value of which may be controlled through the parameter h.

This is one of the characteristics that characterize the Stirling interpolation formula, and thus makes the approximation of functions with this formula more flexible than with traditional approaches.

Figure 2:
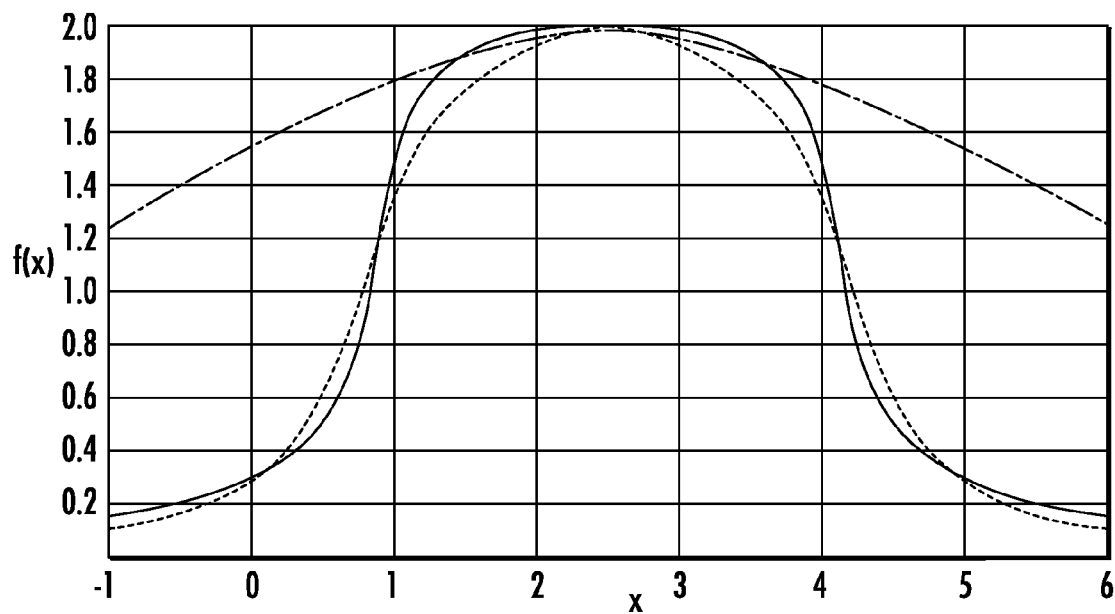
FIG. 2 compares the second order polynomial approximations of a function f (solid line) obtained respectively with the Stirling interpolation formula (dot-dashed line) and with the series of Taylor (dashed line) according to the present invention.

FIG. 2 compares the polynomial approximation to the second order as a function f in the neighborhood of a point $\bar{x}$ carried out respectively with the Stirling approximation formula, and the Taylor series expansion. It is possible to infer that the approximation obtained with the Taylor series expansion worsens significantly the more we get far from point $\bar{x}$. The Stirling interpolation formula of the second order, with the parameter h equal to 3.5, fairly approximates the function even relatively far from the point of interest.

The Stirling approximation formula of the second order (equation (14)) in the multi-dimensional case assumes the following form:

$$f(x) \approx f(\bar{x}) + \tilde{D}_{\Delta x} f + \frac{\tilde{D}^2_{\Delta x} f}{2} \quad (17)$$

where operators $\tilde{D}_{\Delta x}$ and $\tilde{D}_{\Delta x}^2$ are defined by the following equations:

$$\tilde{D}_{\Delta x} f = \frac{1}{h} \left( \sum_{p=1}^{n} \Delta x_p \mu_p \delta_p \right) f(\bar{x}) \quad (18)$$

-continued $$\tilde{D}^2_{\Delta x} f = \frac{1}{h^2} \left( \begin{array}{l} \sum_{p=1}^{n} (\Delta x_p)^2 \delta_p^2 + \\ \sum_{p=1}^{n} \sum_{q=1, q \neq p}^{n} \Delta x_p \Delta x_q \delta_p^2 (\mu_p \delta_p)(\mu_q \delta_q) \end{array} \right) f(\bar{x})$$

In equations (18) $\mu_p$ and $\delta_p$ represent the average and difference operators, respectively. One of the characteristics of equation (17) is that it is relevantly simplified by using a particular linear transform in the variable x. Let us consider the following linear transform:

$$z = S^{-1} x \quad (19)$$

and the function $$\tilde{f}(z) = f(Sz) = f(x) \quad (20)$$

While the Taylor series expansions of f and $\tilde{f}$ in a neighborhood of points $\bar{x}$ and $\bar{z}$, respectively, is the same, the Stirling approximation formula does not provide the same result:

$$2\mu_p \delta_p \tilde{f}(\bar{z}) = \tilde{f}(\bar{z}+he_p) - \tilde{f}(\bar{z}-he_p) = f(\bar{x}+hs_p) - f(\bar{x}-hs_p) \quad (21)$$

where $e_p$ is the unity vector with p components, that is:

$$e_p = \begin{bmatrix} 1 \\ \vdots \\ 1 \end{bmatrix}$$

and sp indicates the p-th column of matrix S. It is possible to show that with an appropriate choice of the linear transform S and of the parameter h it is possible to optimize the approximation as a function f of a stochastic variable.

Suppose that the mean and covariance of a vector x of stochastic variables are known, $$\bar{x} = E[x], \quad P_x = E[(x-\bar{x})(x-\bar{x})^T] \quad (22)$$

for determining an average, a covariance and a stochastic correlation as a function f of the variable x, $$\bar{y} = E[f(x)]$$

$$P_y = E[(f(x)-\bar{y})(f(x)-\bar{y})^T]$$

$$P_{xy} = E[(x-\bar{x})(f(x)-\bar{y})^T] \quad (23)$$

Calculating the above mentioned mean values using an approximation of the function based on the Stirling approximation formula is performed. In this context it is particularly useful for a linear transform, such as $$z = S^{-1} x \quad (24)$$

where the matrix S is the Cholesky factor of the covariance matrix $P_x$. That is, it is an upper triangular matrix for the following equation:

$$P_x = SS^T \quad (25)$$

Hereinafter only the function $\tilde{f}(z)$ defined by equation (20) will be considered. Given a first order approximation of the function $\tilde{f}(z)$, $$y = \tilde{f}(\bar{z}+\Delta z) \approx \tilde{f}(\bar{z}) + \tilde{D}_{\Delta z} \tilde{f} \quad (26)$$

with $E[\Delta z]=0$, the expected value of y, that is the average of the function $\tilde{f}(z)$ is $$\bar{y}=E[\tilde{f}(\bar{z})+\tilde{D}_{\Delta z}\tilde{f}]=\tilde{f}(\bar{z})=f(\bar{x}) \qquad (27)$$

As far as the expected value of the covariance is concerned, considering that $E[\Delta z]=0$ and that $E[\Delta z_i \Delta z_j]=0$, $i \neq j$, the following equation holds:

$$P_y = E\left[\left(\tilde{f}(\bar{z}) + \tilde{D}_{\Delta z}\tilde{f} - \tilde{f}(\bar{z})\right)\left(\tilde{f}(\bar{z}) + \tilde{D}_{\Delta z}\tilde{f} - \tilde{f}(\bar{z})\right)^T\right] \qquad (28)$$

$$= E\left[\left(\tilde{D}_{\Delta z}\tilde{f}(z)\right)\left(\tilde{D}_{\Delta z}\tilde{f}(z)\right)^T\right]$$

$$= E\left[\left(\sum_{p=1}^n \Delta z_p \mu_p \delta_p \tilde{f}(\bar{z})\right)\left(\sum_{p=1}^n \Delta z_p \mu_p \delta_p \tilde{f}(\bar{z})\right)^T\right]$$

$$= \sigma_2 \sum_{p=1}^n \left(\mu_p \delta_p \tilde{f}(\bar{z})\right)\left(\mu_p \delta_p \tilde{f}(\bar{z})\right)^T$$

$$= \frac{1}{4h^2}\sum_{p=1}^n \left(\tilde{f}(\bar{z}+he_p)-\tilde{f}(\bar{z}-he_p)\right)\left(\tilde{f}(\bar{z}+he_p)-\tilde{f}(\bar{z}-he_p)\right)^T$$

Exploiting equation (21), the final formula is obtained $$P_y = \frac{1}{4h^2}\sum_{p=1}^n \begin{pmatrix} f(\bar{x}+hs_{x,p}) - \\ f(\bar{x}-hs_{x,p}) \end{pmatrix}\begin{pmatrix} f(\bar{x}+hs_{x,p}) - \\ f(\bar{x}-hs_{x,p}) \end{pmatrix}^T \qquad (29)$$

It is possible to verify that the cross-covariance matrix $P_{xy}$ is $$P_{xy} = \frac{1}{2h}\sum_{p=1}^n s_{x,p}(f(\bar{x}+hs_{x,p})-f(\bar{x}-hs_{x,p}))^T \qquad (30)$$

Using a second order approximation of the function $\tilde{f}(z)$, $$y \approx \tilde{f}(\bar{z}) + \tilde{D}_{\Delta z}\tilde{f} + \frac{1}{2}\tilde{D}_{\Delta z}^2\tilde{f} = \tilde{f}(\bar{z}) + \frac{1}{h}\left(\sum_{p=1}^n \Delta z_p \mu_p \delta_p\right)\tilde{f}(\bar{z}) + \qquad (31)$$

$$\frac{1}{2h^2}\left(\sum_{p=1}^n (\Delta z_p)^2 \delta_p^2 + \sum_{p=1}^n \sum_{q=1,q\neq p}^n (\Delta z_q \Delta z_p)(\mu_p \mu_q)(\delta_p \delta_q)\right)\tilde{f}(\bar{z})$$

it is possible to obtain more accurate estimations of the average and of the covariance of the function $\tilde{f}(z)$, respectively $$\bar{y} = \frac{h^2-n}{h^2}f(\bar{x}) + \frac{1}{2h^2}\sum_{p=1}^n \left(\tilde{f}(\bar{x}+hs_{x,p}) - \tilde{f}(\bar{x}-hs_{x,p})\right) \qquad (32)$$

$$P_y = \qquad (33)$$

$$\frac{1}{4h^2}\sum_{p=1}^n (f(\bar{x}+hs_{x,p}) - f(\bar{x}-hs_{x,p}))(f(\bar{x}+hs_{x,p}) - f(\bar{x}-hs_{x,p}))^T +$$

$$\frac{h^2-1}{4h^2}\sum_{p=1}^n (f(\bar{x}+hs_{x,p}) - f(\bar{x}-hs_{x,p}) - 2f(\bar{x}))$$

$$(f(\bar{x}+hs_{x,p}) - f(\bar{x}-hs_{x,p}) - 2f(\bar{x}))^T$$

EKF is one of the most known state observers used for tracking the functioning state of a nonlinear system. It is based on the Taylor series approximation formula that depends only upon the current estimation of the state variables of the system, and not upon the uncertainty/variance associated to this estimation.

The DD1 and DD2 filters, described in the document [3], are among the most known state observers. They are used for tracking nonlinear systems, and they are based on the Stirling approximation formula. These filters are based to the first and second order approximations, respectively, described by equations (27), (29), (31) and (32).

Investigations carried out indicate that one of the characteristics that distinguish the latter approach compared with traditional approaches (such as the EKE), is an approximation of the dynamics of the system that considers not only the current estimation of the state variables, but also uncertainties relating to these estimations.

To further enhance precision, a technique has been devised for using filters DD1 and DD2 in an algorithm similar to EKF in which inner parameters of the filters DD1 and DD2 are established through evolutionary algorithms.

Reference will now be made exclusively to the case in which the filter to be used is a DD1 filter, but the same considerations apply, also if a filter DD2 or any other filter based on the Stirling approximation formula of any order, even larger than the second order, is used.

Compared to the EKF, the Jacobian matrix of equation (10) is substituted by the finite differences. While the formulas for updating the state are the same of that used in an EKF, formulas for updating covariance matrices are sensibly different.

Given the Cholesky factorizations of the covariance matrices Q, R, of process noise and of measurement noise that corrupts measures of the outputs of the process, and the Cholesky factorizations of the covariance matrices $\bar{P},\hat{P}$ associated with the estimation of the state a priori and a posteriori, respectively, $$Q=S_v S_v^T \quad R=S_w S_w^T$$

$$\bar{P}=\bar{S}_x \bar{S}_x^T \quad \hat{P}=\hat{S}_x \hat{S}_x^T \qquad (34)$$

for equation (29) it is:

$$S_{xx}^{(1)}(k)=\{S_{xx}^{(1)}(i,j)\}=\{(f_i(\hat{x}_k+h\hat{s}_{x,j},u_k,\bar{v}_k)-f_i(\hat{x}_k-h\hat{s}_{x,j},u_k,\bar{v}_k))/2h\}$$

$$S_{xv}^{(1)}(k)=\{S_{xv}^{(1)}(i,j)\}=\{(f_i(\hat{x}_k,u_k,\bar{v}_k+hs_{v,j})-f_i(\hat{x}_k,u_k,\bar{v}_k-hs_{v,j}))/2h\}$$

$$S_{y\bar{x}}^{(1)}(k)=\{S_{y\bar{x}}^{(1)}(i,j)\}=\{(g_i(\bar{x}_k+h\bar{s}_{x,j},\bar{w}_k)-g_i(\bar{x}_k-h\bar{s}_{x,j},\bar{w}_k))/2h\}$$

$$S_{yw}^{(1)}(k)=\{S_{yw}^{(1)}(i,j)\}=\{(g_i(\bar{x}_k,\bar{w}_k+hs_{w,j})-g_i(\bar{x}_k,\bar{w}_k-hs_{w,j}))/2h\} \qquad (35)$$

wherein $\hat{s}_{x,j}, \bar{s}_{x,j}, s_{w,j}, s_{v,j}$ is the j-th column of the matrix $\hat{S}_x, \bar{S}_x, S_w, S_v$, respectively.

Considering the state vector increased a component $\Delta \check{x}$ due to process noise:

$$\check{x} = \begin{bmatrix}\tilde{x} + \Delta\check{x}\end{bmatrix} = \begin{bmatrix}\hat{x}+\Delta x \\ \bar{v}+\Delta v\end{bmatrix} \qquad (36)$$

Process noise is assumed to be independent from the state of the system, thus the covariance of $\Delta\check{x}$ is $$\hat{P}_{\tilde{x}} = \begin{bmatrix} \hat{P} & 0 \\ 0 & Q \end{bmatrix} = \begin{bmatrix} \hat{S}_x & 0 \\ 0 & S_v \end{bmatrix} \begin{bmatrix} \hat{S}_x & 0 \\ 0 & S_v \end{bmatrix}^T = \hat{S}_{\tilde{x}} \hat{S}_{\tilde{x}}^T \quad (37)$$

Introducing the linear transform $\check{x} = \hat{S}_{\tilde{x}} z$, the problem of estimating the state may be translated in processing a general function $\tilde{f}(z)$.

For the a priori update, the state equation (27) is used. In this case f represents the nonlinear function that ties the state variables of the system, the inputs and the process noise at step k-th to the a priori estimation of the state variables at step (k+1)-th. Therefore, by applying equation (27), the following equation is obtained:

$$\bar{x}_{k+1} \approx \tilde{f}(\bar{z}_z) = f(\hat{x}_k, u_k, \bar{v}_k) \quad (38)$$

while, for the a priori update of the covariance matrix of the state, equations (29) and (35) are obtained, $$\bar{P}(k+1) = [S_{xx}^{(1)}(k) S_{xv}^{(1)}(k)][S_{xx}^{(1)}(k) S_{xv}^{(1)}(k)]^T = S_{xx}^{(1)}(k)(S_{xx}^{(1)}(k))^T + S_{xv}^{(1)}(k)(S_{xv}^{(1)}(k))^T \quad (39)$$

The Cholesky factor of the covariance matrix of the state is immediately obtainable. A $$\bar{S}_x(k+1) = [S_{xx}^{(1)} S_{xv}^{(1)}] \quad (40)$$

rectangular matrix is obtained. Through a Householder triangularization, the Cholesky factor of the covariance matrix of the state at step k+1 is obtained.

As far as the a posteriori estimation of data of state variables of the system is concerned, the outputs of the process are estimated by using the second of the two nonlinear functions that describe the dynamics of the system, that is:

$$\bar{y}_k = g(\bar{x}_k, \bar{w}_k) \quad (41)$$

As far as the covariance matrix $P_y(k)$ is concerned, associated with the estimation error of the outputs of the process, the following matrix $$S_y(k) = [S_{y\bar{x}}^{(1)}(k) S_{yw}^{(1)}(k)] \quad (42)$$

is a Cholesky factor of the matrix $P_y(k)$:

$$P_y(k) = S_y(k)(S_y(k))^T \quad (43)$$

The matrices $S_y(k)$ and $\bar{S}_x(k)$ are transformed in square matrices through the Householder triangularization. By substituting equations (35) in equation (30) the following expression for the cross-covariance matrix of the DD1 filter is obtained, $$P_{xy}(k) = \bar{S}_x(k)(S_{\bar{y}\bar{x}}^{(1)}(k))^T \quad (44)$$

The a posteriori state is updated with the well known formula $$\hat{x}_k = \bar{x}_k + K_k(y_k - \bar{y}_k) \quad (45)$$

wherein the gain $K_k$ of the filter has the following expression:

$$K_k = P_{xy}(k)[S_y(k)(S_y(k))^T]^{-1} \quad (46)$$

The a posteriori covariance matrix $P_y(k)$ may be updated with the classic equation $$\hat{P} = \bar{P} - K P_y K^T \quad (47)$$

or by updating the Cholesky factor of the matrix.

Even for using a DD1 or DD2 filter it is necessary to know the covariance matrices of the process noise, of the measurement noise and of the initial value of the covariance matrix relative to the estimation of the state variables.

This difficulty is overcome by carrying out a preliminary off-line tuning. This preliminary operation is carried out by driving the system according to a pre-established input pattern, sensing the values of output variables and of at least a state variable instant by instant through sensors and updating the covariance matrices of the measurement noise and the process noise and the initial values of the covariance matrix of the state with and evolutionary algorithm to minimize a pre-established cost function.

Preferably, this cost function is the root mean square of the difference between the estimated values and the respective sensed values.

Once the covariance matrices $\bar{Q}$, $\bar{R}$ and the initial values of the covariance matrix of the state are determined off-line, the state observer is trained for estimating data of state variables of the system without using the sensor of the state variable. Such a state observer may be used, in particular (but not only), for controlling a brushless motor without using any position and/or speed sensor.

To better understand how the control method works, let us refer to the case of a brushless motor. The same considerations hold for any other physical system, the functioning of which is to be controlled, such as DC or AC electrical motors.

Figure 3:
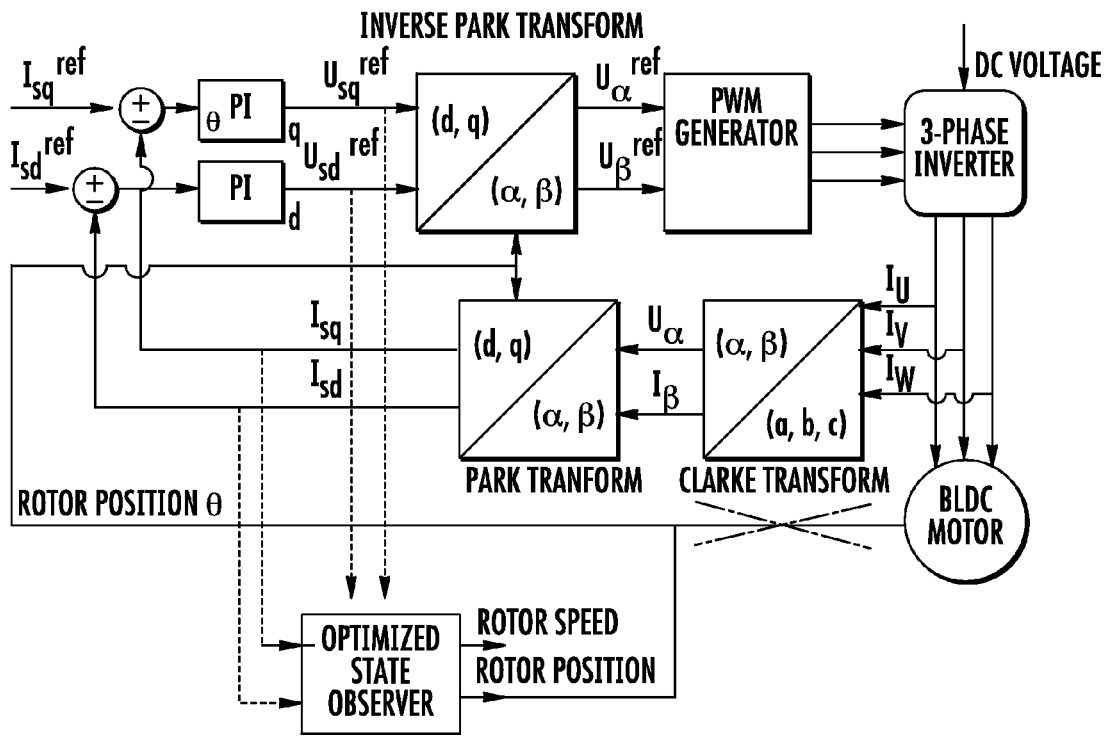
FIG. 3 is a block diagram of the model of a state observer used for tracking the kinematics of the rotor of a permanent magnet brushless machine (i.e., a BLDC motor) according to the present invention.

Application to the control of a brushless motor will now be discussed. The free-derivative state observer shown above is used for estimating position and speed of a permanent magnet brushless motor. FIG. 3 depicts the block diagram of a state observer OPTIMIZED STATE OBSERVER for controlling in a field oriented mode the brushless motor BLDC motor.

The inputs of the state observer are the voltages $U_{sq}^{ref}$ and $U_{sd}^{ref}$ generated by the controllers PI that implement a proportional-integral function, that control the electrical machine through the PWM stage and the currents $I_{sq}$ and $I_{sd}$ in the rotoric reference system. The values of these currents are obtained by measuring the currents $I_U$, $I_V$ and $I_W$ and by applying the above mentioned Clarke and Park transforms.

A characteristic of the state observer is that it is capable of estimating speed and position of a brushless motor without using a dedicated sensor (such as resolvers, Hall sensors, encoders and the like). The estimation of the rotor position is used for carrying out the direct and inverse Park transforms.

Figure 4:
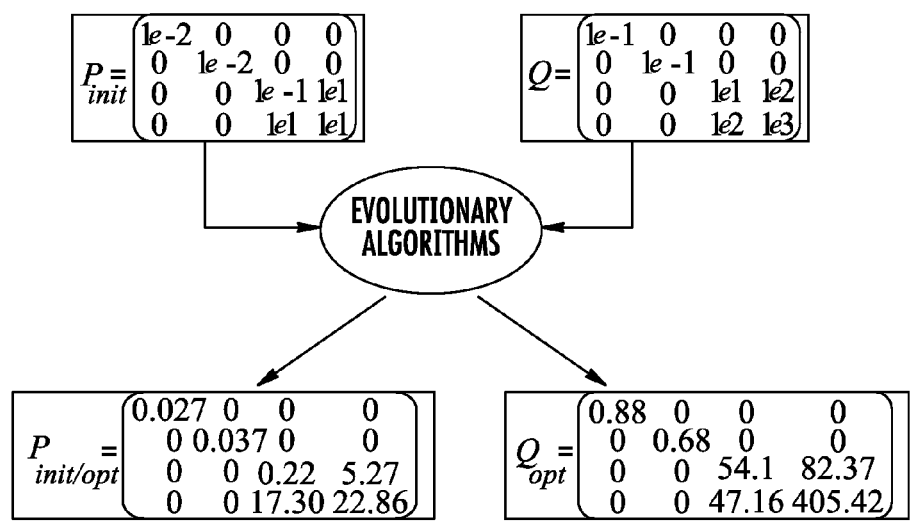
FIG. 4 schematically depicts the operation carried out by the evolutionary algorithms on the covariance matrices of the state variables and on the covariance matrix of the process noise according to the present invention.

The initial values of the covariance matrix of the state variables and the covariance matrices associated to the process noise and measurement noise are determined in an off-line tuning phase. FIG. 4 shows how the initial value of the covariance matrix of the state variables and how the covariance matrix relative to the process noise are adjusted because of the automatic tuning guided by evolutionary algorithms.

The performances of the state observer are excellent due to the tuning procedure of the parameters of the filter. Compared with other known approaches available in the literature, such as the approaches described in the introduction (Luenberger observer, EKF), the state observer in accordance with the present invention may be used for estimating position and speed of the rotor of a brushless motor even without knowing the initial position of the rotor, but by knowing exclusively its initial speed. This is not a limitation when the initial speed is known (e.g., it is null), for example, it is the control of the motor starts when it is still.

Also, this characteristic distinguishes the method in accordance with the invention from other approaches, making it implementable in real-time applications that involve electrical machines, such as the EPS systems [7].

Figure 5:
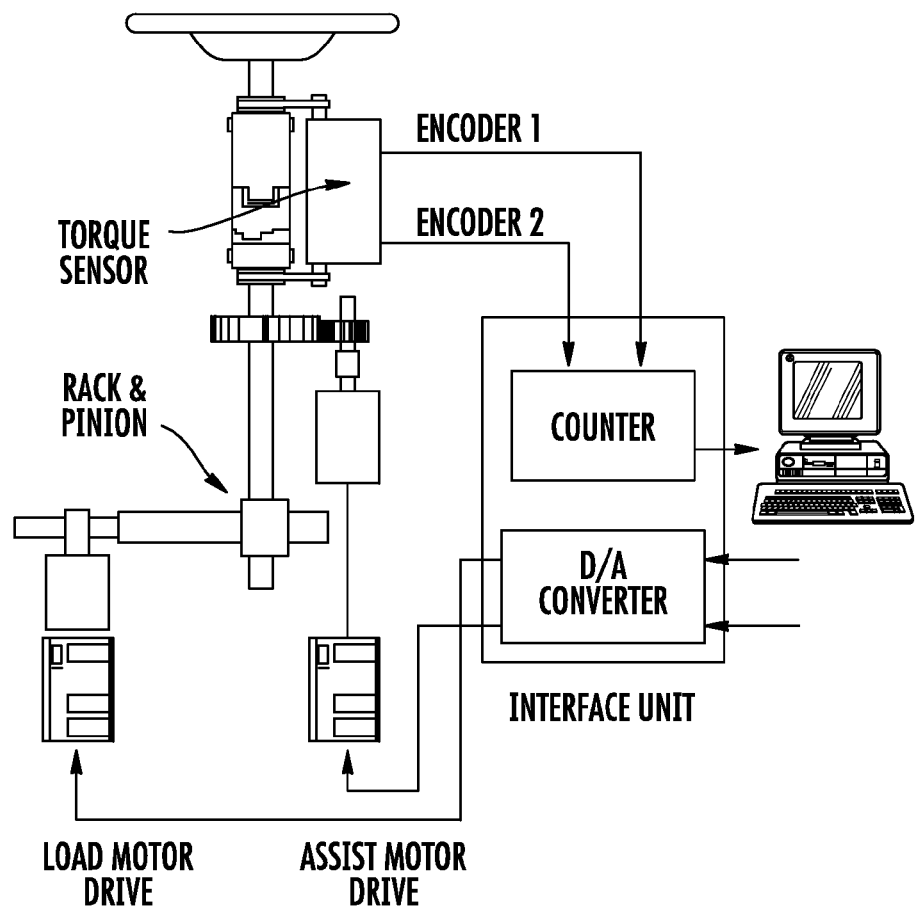
FIG. 5 depicts a block diagram of a column EPS system in a HILS (Hardware-In-The-Loop Simulation) configuration according to the present invention.

EPS (Electric Power Steering) system will now be discussed. As an application of a system on which to test the method for controlling a brushless motor, a column type EPS system [1] and [2] has been considered. The brushless motor contained therein is connected to the steering column through torque reducers. FIG. 5 describes the experimental set-up of the EPS system in an HILS configuration (Hardware-In-the-Loop Simulation). A further brushless motor is used for providing to the rack-pinion system different profiles of load torques.

Through these profiles it is possible to simulate the torque that opposes the steering action of the driver due to the coupling of the wheels of the vehicle with the road during the running of the vehicle. In the HILS configuration both brushless motors, the motor that powers the steering by supplying a supplementary steering torque through the torque reduction gears and the motor that supplies an opposing torque to the rack-pinion system, are controlled by a PC. The torque and the steering angle are measured by a torque sensor mounted on the top of the steering column.

Figure 8:
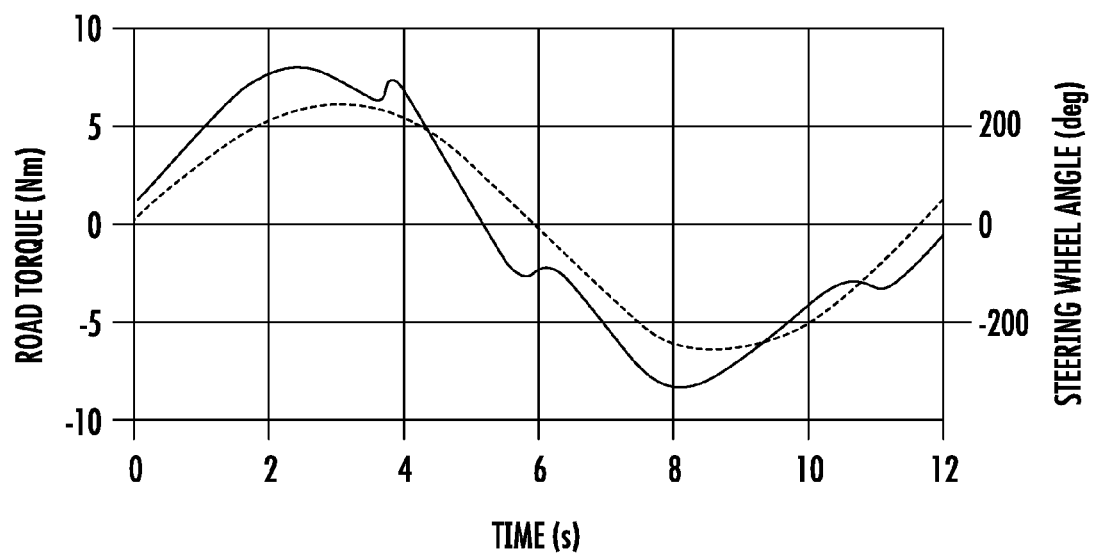
FIG. 8 depicts a typical waveform of the load torque (solid line) due to friction between the road and the wheels as a function of the steering angle (dashed line) determined by a driver during the motion of a vehicle according to the present invention.

FIG. 8 depicts the sensor. The sensor is a torsion bar in which two optical encoders measure respectively the angular position of the steering-wheel $\theta_{SW}$ (steering angle) and the angular position $\theta_{SS}$ with respect to the steering column (that is, the angular position with respect to the steering shaft). The steering torque applied by the driver during the motion of the vehicle is given by the following relation, $$T_S = k_{torsion} \Delta\theta = k_{torsion}(\theta_{SW} - \theta_{SS}) \quad (48)$$

wherein $k_{torsion}$ is the torsion rigidity of the torsion bar.

Figure 6:
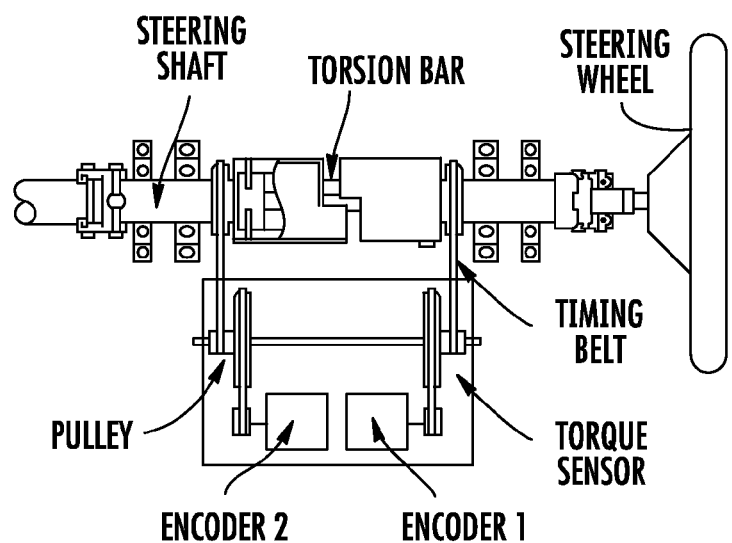
FIG. 6 depicts a torque sensor used for measuring the steering torque TS felt by a driver while steering according to the present invention.

From a mechanical point of view the described EPS system in FIGS. 5 and 6 may be subdivided into two parts, a steering column and an assisting electrical motor. Let $T_s$, $T_l$, $T_m$ be the steering torque, the load torque transmitted from the rack-pinion system to the steering column and the torque generated by the assisting electrical motor, respectively. As far as the load torque $T_l$ is concerned, it takes into account the friction between the wheels and the road and the efficiency of the mechanical gears for transmitting torques (rack-pinion, steering shaft and the like). From the equation that describes the mechanical equilibrium of the electrical motor, $$J_m \ddot{\theta}_m + b_M \dot{\theta}_m = T_m - \frac{T_l}{N} \quad (49)$$

wherein $J_m$ and $b_m$ are the inertia momentum and the dampening coefficient of the electrical motor, and N is the ratio reduction/transmission relative to the reduction gear that couples the assisting electrical motor to the steering column.

The position $\theta_m$ of the rotor of the electrical motor (the rotor is connected to a servo-system that, through a reduction gear allows the motor to transfer the generated torque to the steering torque) and the angle $\theta_{SS}$ sensed by the torque sensor to the steering shaft are tied to the ratio N, indeed $\theta_m = N\theta_{SS}$. The equations used for describing the functioning of the brushless motor of this application are equations (4).

Figure 7:
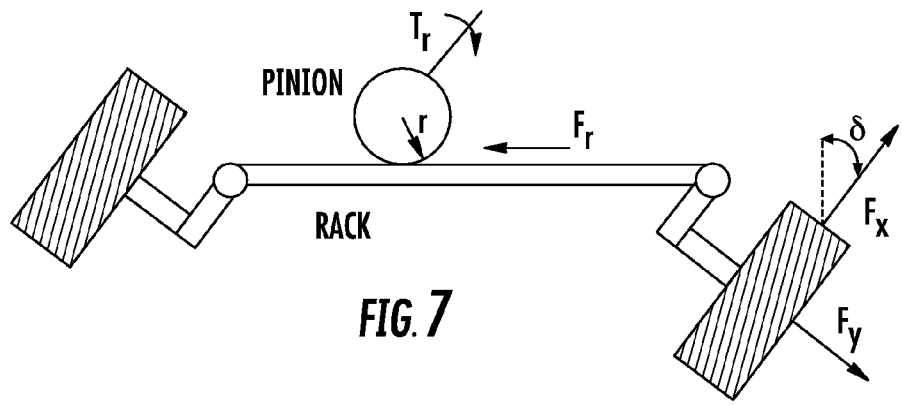
FIG. 7 depicts schematically the rack-pinion system associated with the considered EPS system according to the present invention.

To complete the model of the EPS system, an estimation of the load torque $T_l$ is required. To estimate the resisting torque due to the coupling of the wheels with the road the Dugoff model [5] has been used. Referring to FIG. 7, transversal friction $F_y$ and longitudinal friction $F_x$ that act on the wheel during the motion of the vehicle are expressed through the following equations:

$$F_x = \frac{AK_x s}{1-s} \quad (50)$$

$$F_y = \frac{AK_y \tan\alpha}{1-s}$$

wherein $K_x$ and $K_y$ represent the longitudinal and the lateral rigidity of the wheel, while A, s, α are respectively the area of contact of the wheel with the road surface, the slipping ratio and the slipping angle. The force $F_R$ transmitted to the rack by friction that acts on the wheels is $$F_R = F_x \sin\delta + F_y \cos\delta \quad (51)$$

wherein δ is the real steering angle transmitted to the wheel from the steering system. It is tied to the steering angle fixed by the driver through a simple linear equation, $\theta_{SW} = n\delta$. The factor n considers how, as a function of the geometric-mechanical characteristics of the EPS system, the steering angle $\theta_{SW}$ imposed by the driver is transmitted to the wheels.

The antagonist torque $T_{road}$ due to the coupling of the wheels with the road is simply obtained by the vector product of the force $F_R$ to which the rack is subjected during the motion of the vehicle and the radius r of the pinion:

$$T_{road} = F_R \times r = \left(\frac{AK_x s}{1-s}\sin\left(\frac{\theta_{sw}}{n}\right) + \frac{AK_y \tan\alpha}{1-s}\cos\left(\frac{\theta_{sw}}{n}\right)\right) \times r \quad (52)$$

FIG. 8 depicts the graph of the load torque due to friction between the road and the wheels of the vehicle for certain established values of the slipping angle and of the slipping ratio (S, α).

In the simulation of the EPS system, it has been assumed that the load torque $T_l$ coincides with the torque $T_{road}$, that is, contributions to $T_l$ due to the efficiency of the steering system have been neglected.

The main functions of an EPS system are the reduction of the steering torque and the improvement of the return of the steering wheel to its start position after a cornering (a displacement describing a J). In a typical cornering, an assisting torque is initially provided to the steering column for reducing the torque that a driver feels while steering. Immediately after the steering action, the EPS system rotates the steering-wheel to its initial position without oscillations and overshoots, that otherwise would be present if the power steering system was not present.

In other words, time intervals in which the control logic circuitry of the EPS is enabled for reducing the steering torque and for rotating the steering wheel in its initial position are distinct.

In the ECU that manages EPS systems two distinct control logics are implemented for these two distinct control/servo-assistance actions. In simulations carried out it has been considered only the first of these two distinct aspects of the action of an EPS system.

Figure 9:
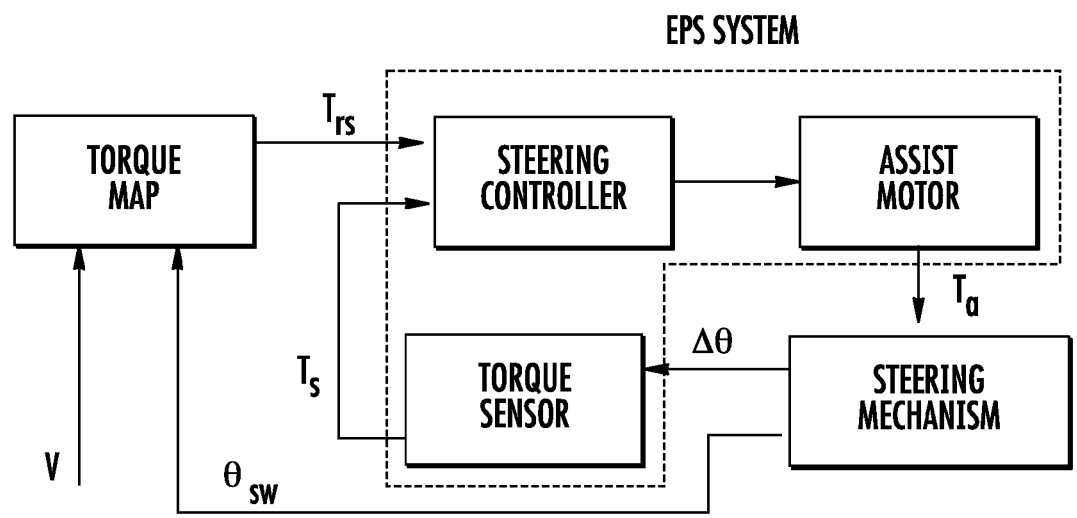
FIG. 9 depicts a block diagram of the control logic for reducing the steering torque in an EPS system according to the present invention.

FIG. 9 depicts a block diagram of the control logic for reducing the steering torque in an EPS system.

The idea of this control includes encoding in the block TORQUE MAP the driving style of a driver, that is a function of the speed V of the vehicle and of the steering angle $\theta_{SW}$ established by the driver, The objective of the control is to make the torque felt by the driver while steering, that is $T_S$, be as close as possible to the reference torque, that is $T_{rs}$, stored in the look-up table of the block TORQUE MAP. The function that gives the steering torque upon the vehicle speed and the steering angle $\theta_{SW}$ may be illustrated as follows.

It is well known that at low speeds, for example during parking maneuvers or in traffic jams, drivers desire a relevant assisting torque $T_a$ be supplied by the electrical motor for driving with little effort, while at high speeds drivers desire a stronger steering torque to feel more secure while steering. That is, a weaker assisting torque $T_a$ is required from the EPS system. The assisting torque increases with the steering angle, for example proportionally to it.

Figure 10:
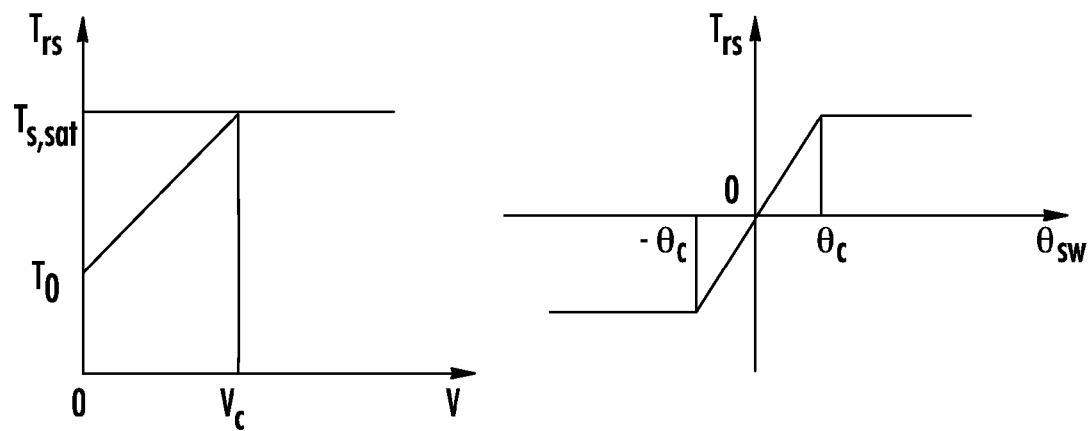
FIG. 10 depicts a possible waveform of the reference steering torque as a function of the speed of the vehicle and of the steering angle according to the present invention.
Figure 11:
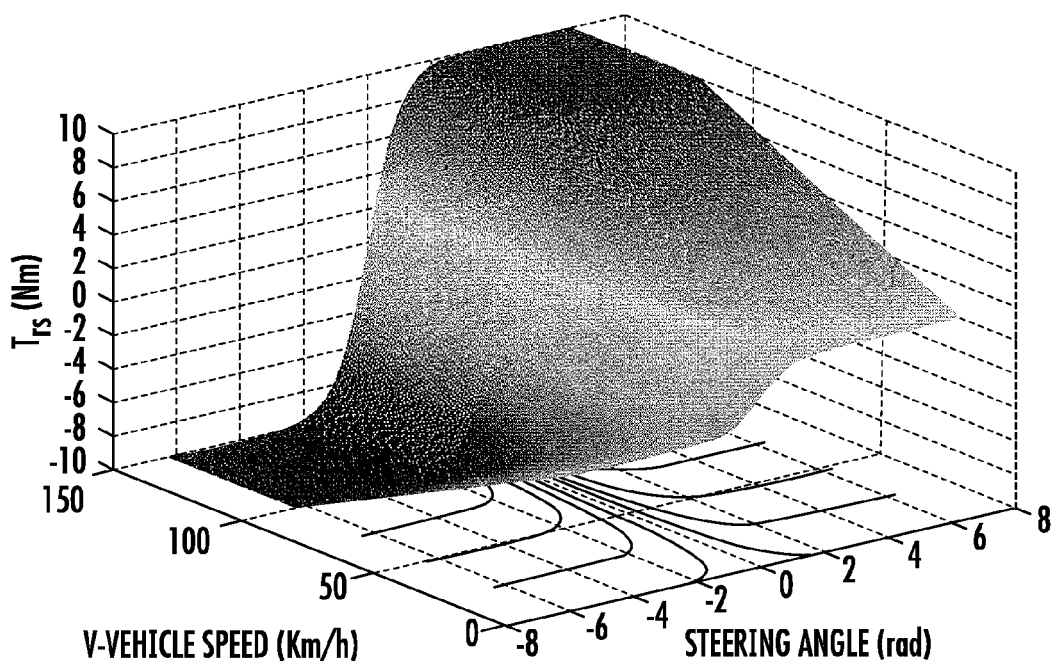
FIG. 11 is a sample 3-D representation of a typical look-up table used for describing how the reference steering torque depends on the vehicle speed and on the steering angle according to the present invention.

In FIG. 10 the graphs of the reference steering torque as a function of the speed of the vehicle and of the steering angle are depicted. A sample 3-D representation of a look-up table of the reference steering torques is depicted in FIG. 11.

All the mechanical parts of the column EPS system described in this section have been modeled using the MAT-LAB/SIMULINK™ tool.

Test of the model of the state observer will now be discussed. In the architecture of the EPS system described in the previous section a model of a permanent magnet brushless machine controlled with a field oriented control technique has been used. The free derivative state observer uses this model for estimating at each simulation step angular position, and speed of the rotor of the electrical machine. The testing of the model has been carried out on a typical pattern of the application of EPS system. That is, for sinusoidal waveforms of the steering angle and increasing profiles of the vehicle speed. The results obtained with the simulation demonstrate the effectiveness of the method.

FIGS. 12, 13, 14, 15, 16 illustrate the results of a simulation of the EPS system in which the kinematics (position and speed) of the rotor of the brushless motor has been estimated on a test pattern by the method and compared with that measured through dedicated sensors.

Comparing the results it is evident that only with the illustrated method it is possible to obtain accurate estimations even if the initial position of the rotor is not known. Indeed, in the graph of FIG. 12, the curve that represents the graph of the position of the rotor obtained by using solely the equations of the dynamics of the system, do not track the sensed values because it is not possible to compensate the fact that the initial position of the rotor is unknown. The waveform is sinusoidal, but it is translated with respect to the sensed waveform by a certain amount.

This result shows that the method is capable of estimating correctly the position of the rotor even when the assumed initial state of the system is not accurately determined. Such a situation could occur when the electrical motor is started-up, because the initial speed of the rotor is known (it is null). But it could not be possible to determine precisely its initial position.

Figure 12:
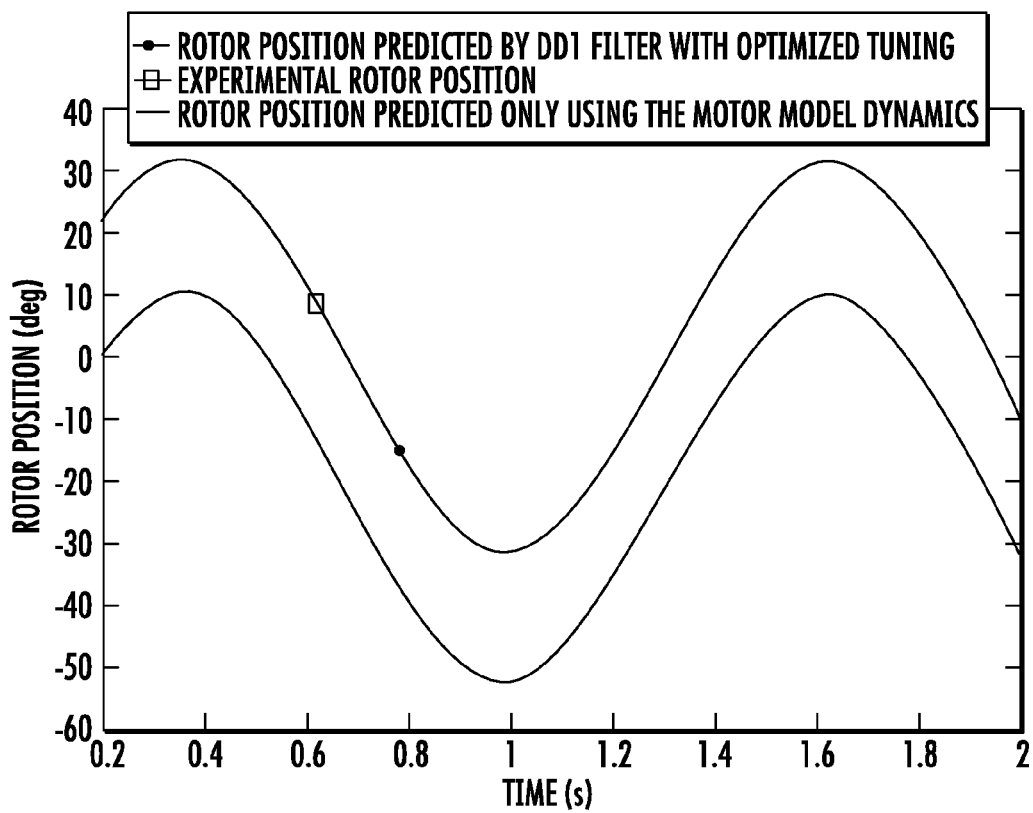
FIG. 12 compares the waveform of the estimated position of the rotor as a function of the time with that measured by an ad hoc sensor and with that estimated using only an input-state-output mathematical model of the system, using a specific test pattern and ignoring the initial position of the rotor according to the present invention.
Figure 14:
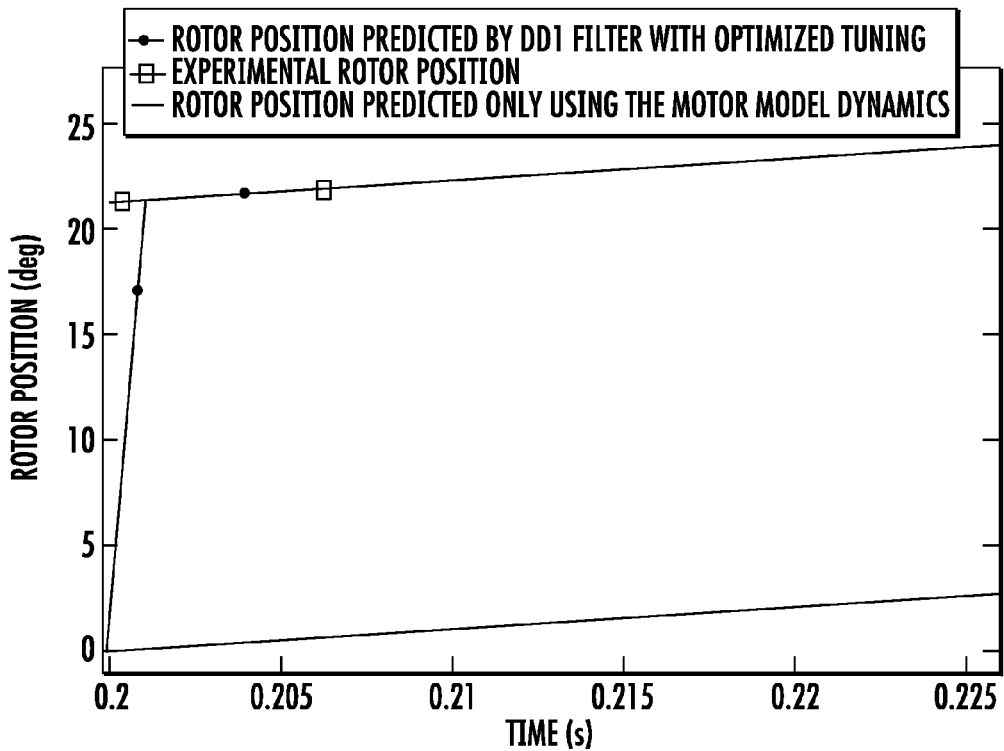
FIG. 14 is a magnified view of a portion of the graph of FIG. 12 between about 0.2 and 0.225 seconds according to the present invention.
Figure 15:
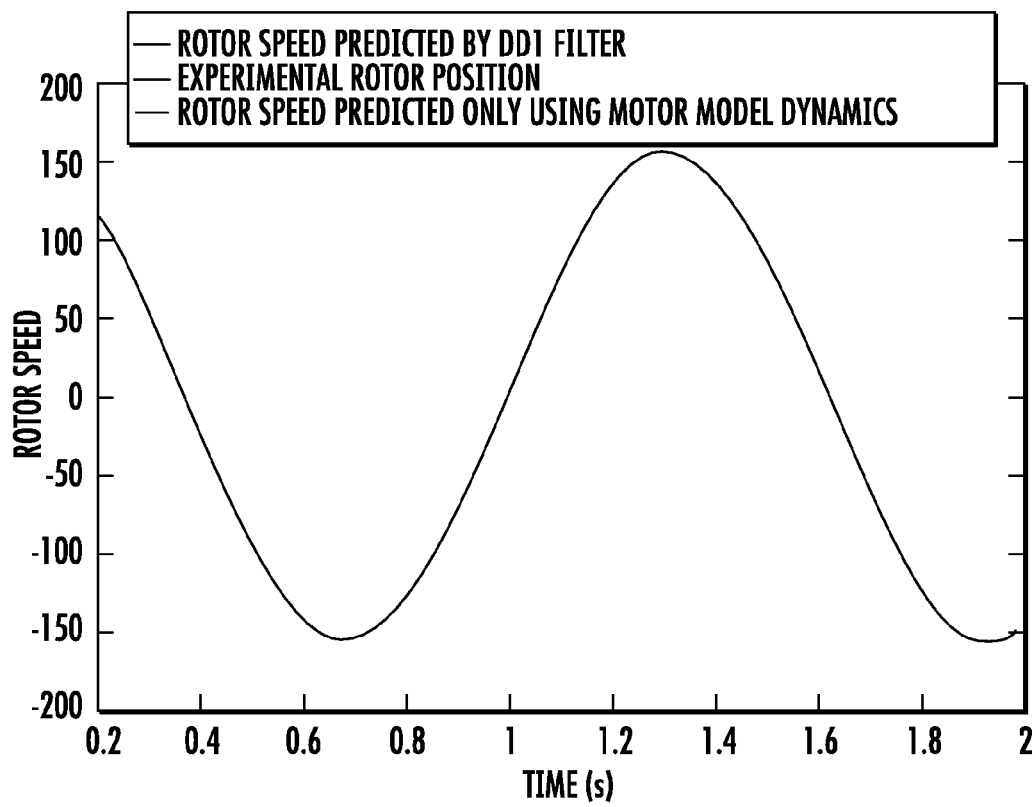
FIG. 15 compares the estimated speed of the rotor according to the present invention with that measured by an ad hoc sensor and with that estimated using only an input-state-output mathematical model of the system.
Figure 16:
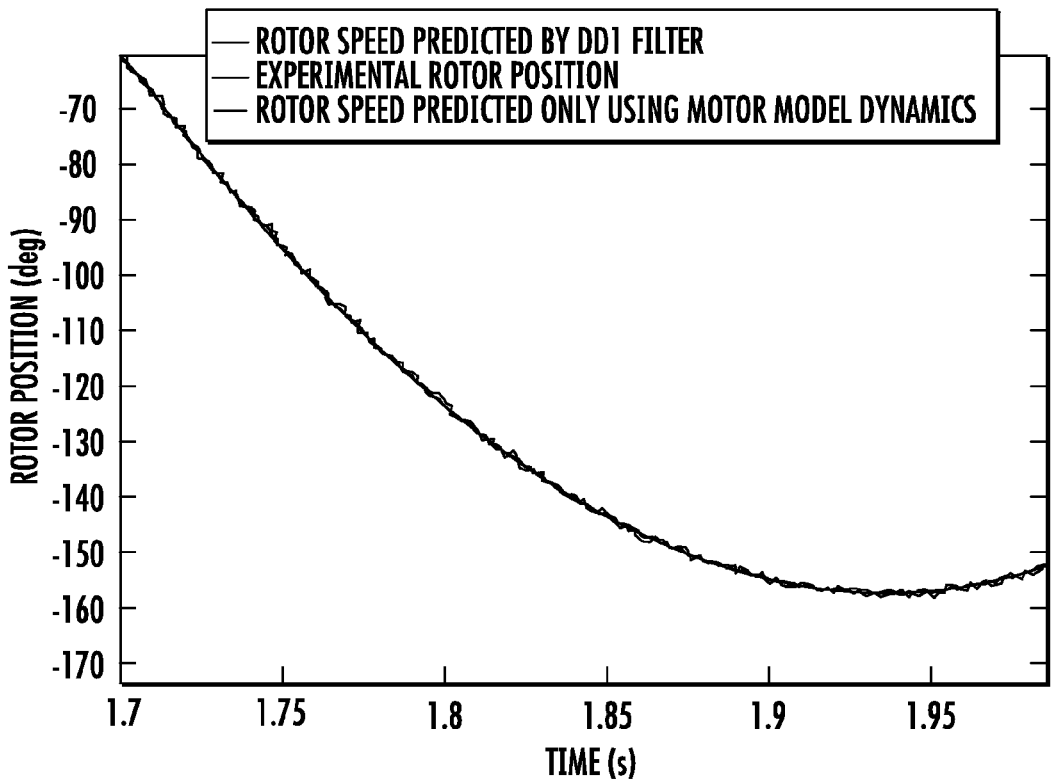
FIG. 16 is a magnified view of a portion of the graph of FIG. 12 between about 1.7 and about 1.95 seconds.
Figure 17:
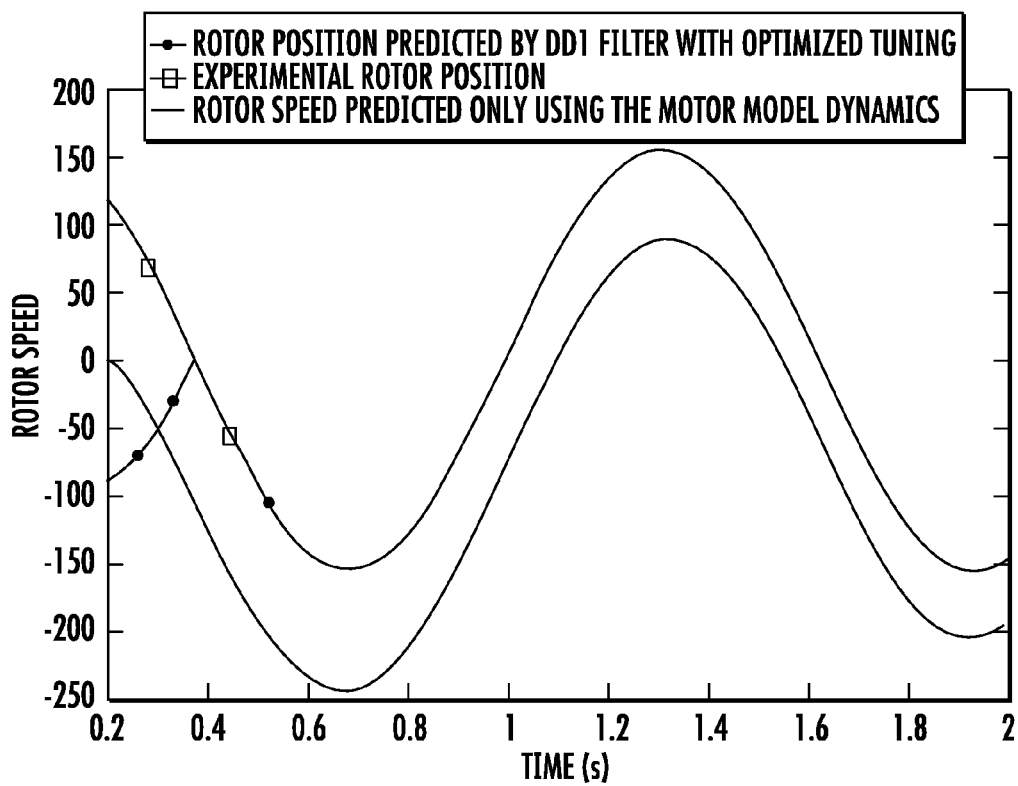
FIG. 17 compares the speed of the rotor estimated according to the present invention with that measured by an ad hoc sensor and with that estimated using only an input-state-output mathematical model of the system, ignoring the initial speed of the rotor.

FIG. 14 is a detail view of the graph of FIG. 12. It is evident how fast the values estimated with the method are corrected for tracking the waveform that describes the measured position of the rotor by a dedicated sensor. Moreover, the illustrated method is effective even when both speed and initial position of the rotor are unknown.

Figure 18:
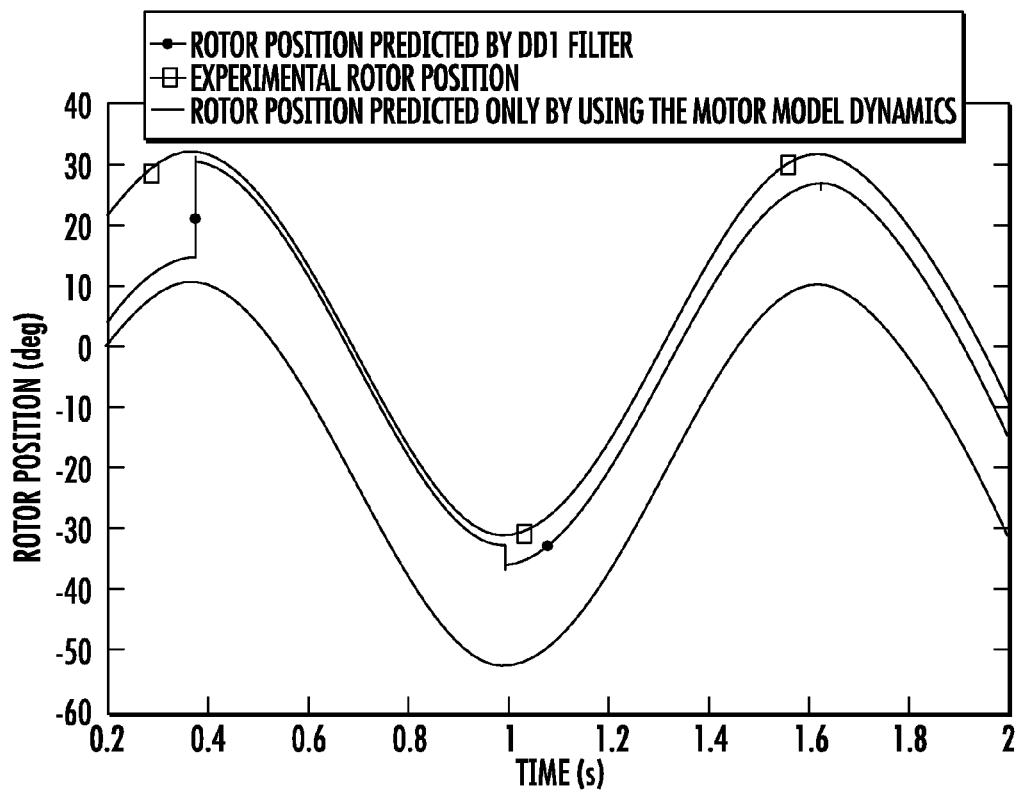
FIG. 18 compares the rotor position estimated by the non-optimized state observer DD1 with the position of the rotor measured by an ad hoc sensor and with the angular position of the rotor estimated using only an input-state-output mathematical model of the system, ignoring both the initial speed and the initial position of the rotor according to the present invention.

FIG. 18 depicts the result of a simulation in which also the initial speed of the rotor is unknown. This situation could occur, for example, in an EPS application when, because of the fact that the vehicle is running fast in a highway, the electrical motor is disabled. Or in an e-brake application when, because of an abrupt brake after having brought a piston in its rest position, the rotor of an electrical motor is disconnected from the servo-system that couples it to the piston. In both cases, the method of is capable of resuming in a short time an efficient tracking of the kinematics of the rotor even using an inaccurate determination of the initial conditions.

It is worth remarking that an important aspect of the invention: parameters of the filter DD1 are optimized through evolutionary (genetic) algorithms, such as the PSOA (Particle Swarm Optimization Algorithm) or the ES (Evolution Strategies). The optimized tuning procedure not only simplifies the set-up phase of the considered model of the state observer but, which is importance, allows the tracking performances to be enhanced.

Figure 13:
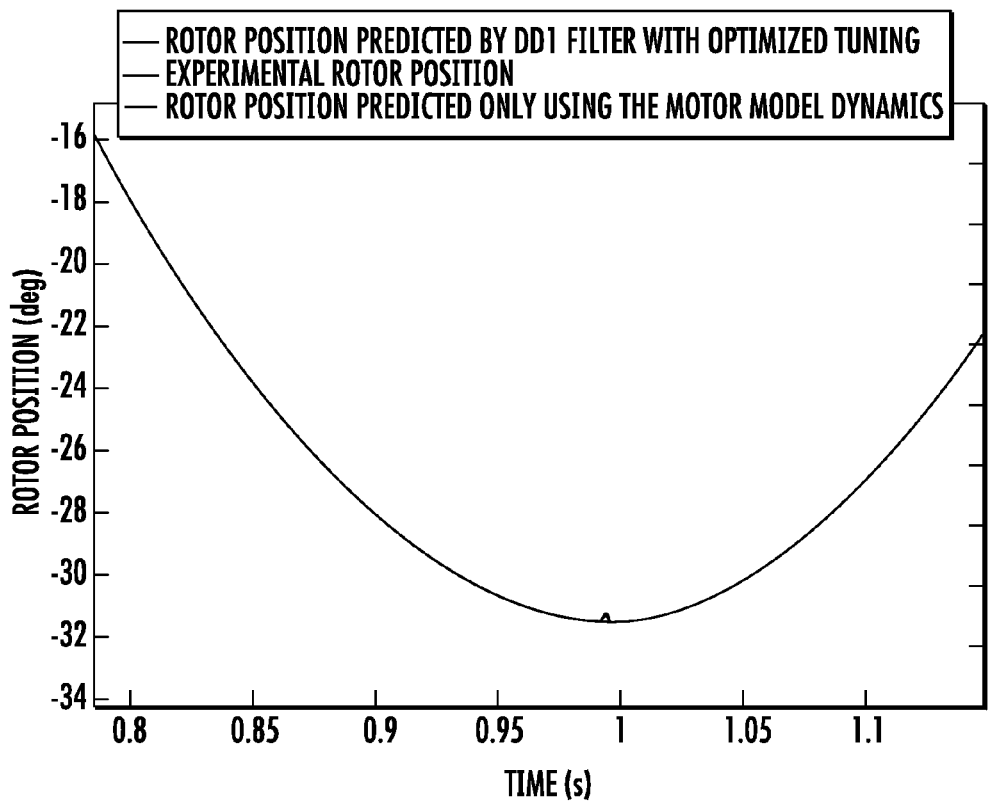
FIG. 13 is a magnified view of a portion of the graph of FIG. 12 between about 0.8 and 1.15 seconds according to the present invention.

FIG. 18 shows the results that have been obtained after having spent a very long time for searching the optimal values of parameters of the filter in the estimation of the angular position of the rotor of the brushless machine on the same specific patterns of the same application considered in FIGS. 12, 13 and 14. With an optimized tuning of the parameters of the filter, it is possible to compensate immediately the fact that the initial angular position of the rotor is unknown, and it is possible to have a negligible error in steady-state conditions.

From the test of the described model in a simulation of an EPS application, it is evident that the method for estimating data of state variables can be used for tracking the kinematics of the rotor of a brushless motor. A device implementing the method estimating speed and position of a rotor of a motor could replace a dedicated sensor used for monitoring the rotor position.

In safety critical applications (for example, the e-brake) in which two or more sensors of different kinds are used, such a device could be used instead of one of these sensors. For non safety-critical applications, it could be used for a sensorless control of the brushless electrical machine.

Independently from the type of application, the method could be used in a diagnostic device for sensing, possibly in advance, abnormal functioning of certain parts of the system, such as possible faults of sensors, of actuators, or even variations of intrinsic structural parameters of the system. Depending on the cases, these faults could be simply diagnosed for signaling the driver that parts/subsystems of the vehicle need to be checked, or could be balanced/compensated by adjusting internal parameters of the control system.

REFERENCES

[1] J. H. Kim, J. B. Song, Control Logic for an Electric Power Steering System using Assist Motor, Mechatronics 12, pp. 447-459, 2002.

[2] A. Badawy, J. Zuraski, F. Bolourchi and A. Chandy, Modeling and Analysis of an Electric Power Steering System, SAE paper 1999-01-0399, 1999.

[3] M. Norgaard, N. K. Poulsen, O. Ravn, Advances in Derivative-Free State Estimation for Nonlinear Systems, Department of Mathematical Modeling and Department of Automation Technical University of Denmark, technical report: IMM-REP-1998-15.

[4] W. Reinelt, C. Lundquist, and H. Johansson, On-Line Sensor Monitoring in an Active Front Steering System using Extended Kalman Filter, SAE paper 2005-01-1271.

[5] H. Dugoff, P. S. Fancher, An Analysis of the tyre Traction Properties and their Influence on Vehicle Dynamic Performance, SAE paper 700377, 1970.

[6] H. G. Beyer, The Theory of Evolution Strategies, Natural Computing Series, Springer, 2001.

[7] P. Vas, Sensorless Vector and Direct Torque Control, Oxford Science Publications, Springer, 1998.

That which is claimed:

1. A method for estimating state variables of a system having a known input-state-output mathematical model, the method comprising:
installing an estimator circuit for estimating state variables of the system, the estimator circuit comprising a filter for implementing an estimation according to a Stirling approximation formula as a function of input and output data of the system and of filter parameters representing covariance matrices of process noise and of measurement noise of the system; and
training the estimator circuit by performing the following off-line
supplying the system with input patterns, and detecting corresponding output data and at least one state variable of the system,
estimating the at least one state variable of the system for the input patterns,
adjusting the filter parameters with an evolutionary algorithm for reducing a cost function defined as a function of estimated output data, of sensed output data, of the at least one estimated state variable and of a corresponding at least one sensed state variable, and
estimating the state of the system during normal functioning using the off-line trained estimator circuit.

2. The method of claim 1, wherein the cost function is based on a root means square of a difference between the estimated output data and the sensed output data, and between the at least one estimated state variable and the corresponding at least one sensed state variable.

3. The method of claim 1, wherein the evolutionary algorithm comprises at least one of a particle swarm optimization algorithm (PSOA) and evolution strategy (ES) algorithms.

4. The method of claim 1, wherein the filter comprises at least one of a first order filter and a second order filter.

5. A method for estimating position and speed of a rotor of a brushless motor controlled in a feedback loop comprising a circuit for generating feedback signals representing currents circulating in the brushless motor with respect to a rotoric reference system as a function of currents sensed in windings of the brushless motor, a controller receiving as input respective reference signals and generating respective control voltages with respect to the rotoric reference system, and a power stage receiving as input the respective control voltages, and driving the brushless motor in a PWM mode for nullifying a difference between the feedback signals and the respective reference signals, the method comprising executing at each PWM cycle the following:
sampling the respective control voltages;
calculating currents circulating in the brushless motor with respect to the rotoric reference as a function of an estimated position of the rotor at a current PWM cycle; and
estimating the position and speed of the rotor at a next PWM cycle as a function of the sampled respective control voltages and of the calculated currents, the estimating comprising
implementing an estimation according to a Stirling approximation formula as a function of input and output data of the brushless motor and of filter parameters representing covariance matrices of process noise and of measurement noise of the brushless motor, and
training the estimator circuit by performing the following off-line
supplying the brushless motor with input patterns, and detecting corresponding output data and at least one state variable of the brushless motor,
estimating the at least one state variable of the brushless motor for the input patterns,
adjusting the filter parameters with an evolutionary algorithm for reducing a cost function defined as a function of estimated output data, of sensed output data, of the at least one estimated state variable and of a corresponding at least one sensed state variable, and
estimating the position and speed of the rotor during normal functioning using the off-line trained estimator circuit.

6. The method of claim 5, wherein the calculated currents are obtained from the sensed current flowing through the windings of the brushless motor based on a Clarke transform followed by a Park transform defined as a function of the estimated position of the rotor at the current PWM cycle.

7. The method of claim 5, wherein the cost function is based on a root means square of a difference between the estimated output data and the sensed output data, and between the at least one estimated state variable and the corresponding at least one sensed state variable.

8. The method of claim 5, wherein the evolutionary algorithm comprises at least one of a particle swarm optimization algorithm (PSOA) and evolution strategy (ES) algorithms.

9. The method of claim 5, wherein the estimator circuit comprises a filter comprising at least one first order filter and a second order filter.

10. A device for generating signals representative of speed and position of a rotor of a brushless motor controlled in a feedback loop that includes a circuit for generating feedback signals representing currents circulating in the brushless motor with respect to a rotoric reference system as a function of currents sensed in windings of the brushless motor; a controller receiving as input respective reference signals and generating respective control voltages with respect to the rotoric reference system; a power stage receiving as input the respective control voltages, and driving the brushless motor in a PWM mode for nullifying a difference between the feedback signals and the respective reference signals; the device comprising:
a filter for estimating the position and speed of the rotor at a next PWM cycle as a function of the sampled respective control voltages and of the calculated currents, the estimating comprising
implementing an estimation according to a Stirling approximation formula as a function of input and output data of the brushless motor and of filter parameters representing covariance matrices of process noise and of measurement noise of the brushless motor, and
training said filter by performing the following off-line
supplying the brushless motor with input patterns, and detecting corresponding output data and at least one state variable of the brushless motor,
estimating the at least one state variable of the brushless motor for the input patterns,
adjusting the filter parameters with an evolutionary algorithm for reducing a cost function defined as a function of estimated output data, of sensed output data, of the at least one estimated state variable and of a corresponding at least one sensed state variable, and
estimating the position and speed of the rotor during normal functioning using said off-line trained filter.

11. The device of claim 10, wherein the calculated currents are obtained from the sensed current flowing through the windings of the brushless motor based on a Clarke transform followed by a Park transform defined as a function of the estimated position of the rotor at the current PWM cycle.

12. The device of claim 10, wherein the cost function is based on a root means square of a difference between the estimated output data and the sensed output data, and between the at least one estimated state variable and the corresponding at least one sensed state variable.

13. The device of claim 10, wherein the evolutionary algorithm comprises at least one of a particle swarm optimization algorithm (PSOA) and evolution strategy (ES) algorithms.

14. The device of claim 10, wherein said filter comprises at least one first order filter and a second order filter.

15. A device for feedback controlling a brushless motor comprising:
   a circuit for generating feedback signals representing currents circulating in the brushless motor with respect to a rotoric reference system as a function of currents sensed in windings of the brushless motor;
   a controller for receiving as input respective reference signals and generating respective control voltages with respect to the rotoric reference system;
   a power stage for receiving as input the respective control voltages, and driving the brushless motor in a PWM mode for nullifying a difference between the feedback signals and the respective reference signals; and
   a filter for estimating the position and speed of the rotor at a next PWM cycle as a function of the sampled respective control voltages and of the calculated currents, the estimating comprising
      implementing an estimation according to a Stirling approximation formula as a function of input and output data of the brushless motor and of filter parameters representing covariance matrices of process noise and of measurement noise of the brushless motor, and
      training said filter by performing the following off-line
         supplying the brushless motor with input patterns, and detecting corresponding output data and at least one state variable of the brushless motor,
         estimating the at least one state variable of the brushless motor for the input patterns,
         adjusting the filter parameters with an evolutionary algorithm for reducing a cost function defined as a function of estimated output data, of sensed output data, of the at least one estimated state variable and of a corresponding at least one sensed state variable, and
         estimating the position and speed of the rotor during normal functioning using said off-line trained filter.

16. The device of claim 15, wherein the calculated currents are obtained from the sensed current flowing through the windings of the brushless motor based on a Clarke transform followed by a Park transform defined as a function of the estimated position of the rotor at the current PWM cycle.

17. The device of claim 15, wherein the cost function is based on a root means square of a difference between the estimated output data and the sensed output data, and between the at least one estimated state variable and the corresponding at least one sensed state variable.

18. The device of claim 15, wherein the evolutionary algorithm comprises at least one of a particle swarm optimization algorithm (PSOA) and evolution strategy (ES) algorithms.

19. The device of claim 15, wherein said filter comprises at least one first order filter and a second order filter.

20. A power steering system for a vehicle comprising:
   a brushless motor for generating an auxiliary steering torque as a function of control signals received as input;
   a sensor for generating a signal representing a total steering torque; and
   a control circuit for said brushless motor comprising
      a circuit for generating feedback signals representing currents circulating in said brushless motor with respect to a rotoric reference system as a function of currents sensed in windings of said brushless motor,
      a controller for receiving as input respective reference signals and generating respective control voltages with respect to the rotoric reference system,
      a power stage for receiving as input the respective control voltages, and driving said brushless motor in a PWM mode for nullifying a difference between the feedback signals and the respective reference signals, and
      a filter for estimating the position and speed of the rotor at a next PWM cycle as a function of the sampled respective control voltages and of the calculated currents, the estimating comprising
         implementing an estimation according to a Stirling approximation formula as a function of input and output data of said brushless motor and of filter parameters representing covariance matrices of process noise and of measurement noise of said brushless motor, and
         training said filter by performing the following off-line
            supplying said brushless motor with input patterns, and detecting corresponding output data and at least one state variable of said brushless motor,
            estimating the at least one state variable of said brushless motor for the input patterns,
            adjusting the filter parameters with an evolutionary algorithm for reducing a cost function defined as a function of estimated output data, of sensed output data, of the at least one estimated state variable and of a corresponding at least one sensed state variable, and
            estimating the position and speed of the rotor during normal functioning using said off-line trained filter.

21. The power steering system of claim 20, further comprising a circuit for generating the respective reference signals as a function of the total steering torque.

22. The power steering system of claim 20, further comprising a circuit for establishing the respective reference values as a function of vehicle speed and a steering angle of the vehicle.

23. The power steering system of claim 20, wherein the calculated currents are obtained from the sensed current flowing through the windings of said brushless motor based on a Clarke transform followed by a Park transform defined as a function of the estimated position of the rotor at the current PWM cycle.

24. The power steering system of claim 20, wherein the cost function is based on a root means square of a difference between the estimated output data and the sensed output data, and between the at least one estimated state variable and the corresponding at least one sensed state variable.

25. The power steering system of claim 20, wherein the evolutionary algorithm comprises at least one of a particle swarm optimization algorithm (PSOA) and evolution strategy (ES) algorithms.

26. The power steering system of claim 20, wherein said filter comprises at least one first order filter and a second order filter.

27. A computer-readable medium having computer-executable instructions for causing a computer to perform steps comprising:
- estimating state variables of a system using an estimator circuit, the estimator circuit comprising a filter for implementing an estimation according to a Stirling approximation formula as a function of input and output data of the system and of filter parameters representing covariance matrices of process noise and of measurement noise of the system; and
- training the estimator circuit by performing the following off-line
    - supplying the system with input patterns, and detecting corresponding output data and at least one state variable of the system,
    - estimating the at least one state variable of the system for the input patterns,
    - adjusting the filter parameters with an evolutionary algorithm for reducing a cost function defined as a function of estimated output data, of sensed output data, of the at least one estimated state variable and of a corresponding at least one sensed state variable, and
    - estimating the state of the system during normal functioning using the off-line trained estimator circuit.

28. The computer-readable medium of claim 27, wherein the cost function is based on a root means square of a difference between the estimated output data and the sensed output data, and between the at least one estimated state variable and the corresponding at least one sensed state variable.

29. The computer-readable medium of claim 27, wherein the evolutionary algorithm comprises at least one of a particle swarm optimization algorithm (PSOA) and evolution strategy (ES) algorithms.

* * * * *

UNITED STATES PATENT AND TRADEMARK OFFICE
CERTIFICATE OF CORRECTION

PATENT NO. : 7,659,685 B2  Page 1 of 1
APPLICATION NO. : 11/833053
DATED : February 9, 2010
INVENTOR(S) : Cesario et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 361 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,659,685 B2 |
| APPLICATION NO. | : 11/833053 |
| DATED | : February 9, 2010 |
| INVENTOR(S) | : Cesario et al. |

It is certified that error appears in the above-identified patent and that said Letters Patent is hereby corrected as shown below:

| | |
|---|---|
| Column 3, Line 5 | Delete: "is" <br> Insert: --are-- |
| Column 3, Line 21 | Delete: "is" <br> Insert: --are-- |
| Column 4, Line 5 | Delete: " $\overline{\{v(k)\}}$ " <br> Insert: -- $\overline{\{v(k)\}}$ -- |
| Column 4, Line 8 | Delete: "system of" |
| Column 5, Line 47 | Delete: "EKE" <br> Insert: --EKF-- |
| Column 6, Line 11 | Delete: "EFS" <br> Insert: --EKF-- |
| Column 8, Line 62 | Delete: "+" |
| Column 9, Line 25 | Delete: "+" |
| Column 9, Line 37 | Delete: "characterize" <br> Insert: --characterizes-- |
| Column 12, Line 8 | Delete: "to" <br> Insert: --on-- |

Signed and Sealed this
Seventeenth Day of April, 2012

David J. Kappos
*Director of the United States Patent and Trademark Office*

CERTIFICATE OF CORRECTION (continued)
U.S. Pat. No. 7,659,685 B2

Column 12, Line 14      Delete: "EKE"
Insert: --EKF--

Column 12, Line 30      Delete: "of"
Insert: --as--

Column 12, Line 45      Delete: "$S_{xx}^{(1)}(k) = \{S_{xx}^{(1)}(i,j)\} = \{(f_i(\hat{x}_k + h\hat{s}_{x,j}, u_k, \bar{v}_k) - f_i(\hat{x}_k - h\hat{s}_{x,j}, u_k, \bar{v}_k))/2h\}$"

Insert: --$S_{x\hat{x}}^{(1)}(k) = \{S_{x\hat{x}}^{(1)}(i,j)\} = \{(f_i(\hat{x}_k + h\hat{s}_{x,j}, u_k, \bar{v}_k) - f_i(\hat{x}_k - h\hat{s}_{x,j}, u_k, \bar{v}_k))/2h\}$--

Column 13, Line 22      Delete: "$\bar{P}(k+1) = [S_{x\hat{x}}^{(1)}(k) S_{xv}^{(1)}(k)][S_{xx}^{(1)}(k) S_{xv}^{(1)}(k)]^T =$ |"

Insert: --$\bar{P}(k+1) = [S_{x\hat{x}}^{(1)}(k) \quad S_{xv}^{(1)}(k)][S_{x\hat{x}}^{(1)}(k) \quad S_{xv}^{(1)}(k)]^T$--

Column 13, Line 23      Delete: "$S_{xx}^{(1)}(k)(S_{xx}^{(1)}(k))^T + S_{xv}^{(1)}(k)(S_{xv}^{(1)}(k))^T$"

Insert: --$S_{x\hat{x}}^{(1)}(k)\left(S_{x\hat{x}}^{(1)}(k)\right)^T + S_{xv}^{(1)}(k)\left(S_{xv}^{(1)}(k)\right)^T$--

Column 13, Line 38      Delete: "$\bar{x}_{k+1} \approx f(\bar{z}_z) = f(\hat{x}_k, u_k, \bar{v}_k)$"

Insert: --$\bar{x}_{k+1} \approx f(\bar{z}_k) = f(\hat{x}_k, u_k, \bar{v}_k)$--

Column 14, Line 10      Delete: "and"
Insert: --an--

Column 14, Line 32      Delete: "motor"

Column 17, Line 33      Delete: "has"
Insert: --have--

Column 17, Line 67      Delete: "of"